United States Patent [19]

Taylor et al.

[11] Patent Number: 4,982,352

[45] Date of Patent: Jan. 1, 1991

[54] METHODS AND APPARATUS FOR DETERMINING THE ABSOLUTE VALUE OF THE DIFFERENCE BETWEEN BINARY OPERANDS

[75] Inventors: Gregory F. Taylor, Beaverton; James R. Peterson, Portland, both of Oreg.

[73] Assignee: Bipolar Integrated Technology, Inc., Beaverton, Oreg.

[21] Appl. No.: 441,040

[22] Filed: Nov. 22, 1989

Related U.S. Application Data

[62] Division of Ser. No. 209,156, Jun. 17, 1988.

[51] Int. Cl.$^5$ .............................. G06F 7/38; G06F 7/50
[52] U.S. Cl. ................................ 364/715.01; 364/787
[58] Field of Search .................... 364/715.01, 768, 784, 364/786, 787

[56] References Cited

U.S. PATENT DOCUMENTS

| | | | |
|---|---|---|---|
| 4,218,751 | 8/1980 | McManigal | 364/784 |
| 4,569,032 | 2/1986 | Lee | 364/787 |
| 4,584,661 | 4/1986 | Grundland | 364/787 |
| 4,660,165 | 4/1987 | Masumoto | 364/787 |
| 4,764,886 | 8/1988 | Yano | 364/787 |
| 4,807,172 | 2/1989 | Nuakiyama | 364/715.08 |
| 4,849,921 | 7/1989 | Yasumoto et al. | 364/715.01 |
| 4,858,168 | 8/1989 | Hwang | 364/787 |

*Primary Examiner*—Dale M. Shaw
*Attorney, Agent, or Firm*—Marger Johnson McCollom & Stolowitz, Inc.

[57] ABSTRACT

In a floating point ALU, a carry-lookahead adder circuit includes integral XOR logic means for complementing the sum bits responsive to an invert signal for generating the absolute value of the difference between two binary operands without added gate delay.

7 Claims, 18 Drawing Sheets

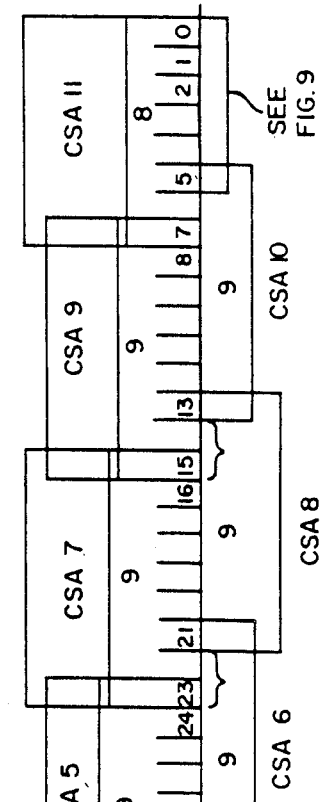
FIG. 5
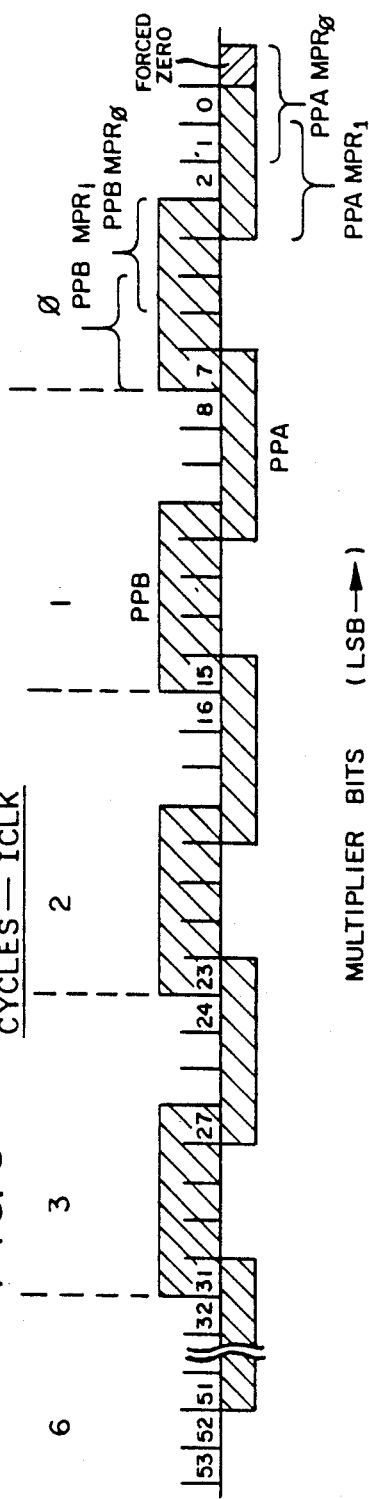
FIG. 7
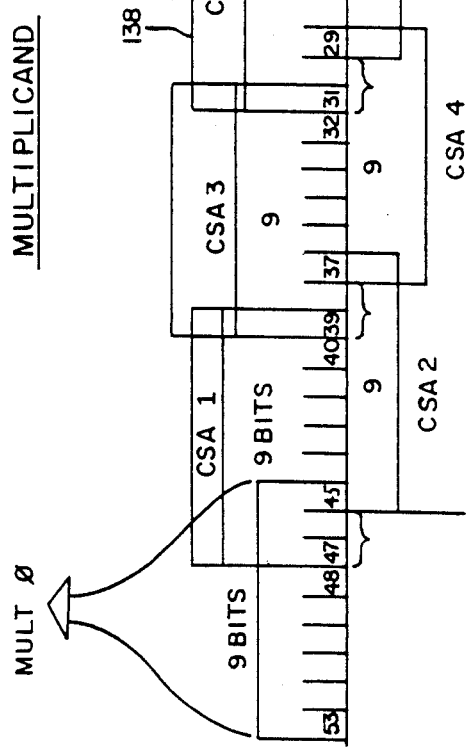

METHODS AND APPARATUS FOR DETERMINING THE ABSOLUTE VALUE OF THE DIFFERENCE BETWEEN BINARY OPERANDS

This application is a division of copending application Ser. No. 07/209,156 filed on June 17, 1988.

BACKGROUND OF THE INVENTION

1. Field of the Invention

The present invention relates to the field of digital computer processors and, more particularly, to fast, very large scale integrated circuit (VLSI) floating point processors for use in computer systems for computation-intensive tasks.

In the field of technical computing, such as digital signal processing, graphics processing, CAD and simulation applications, it is necessary to perform large numbers of arithmetic operations very quickly. Additionally, it is desirable for many applications to perform floating point operations in order to accommodate numbers which vary widely in magnitude.

Most general purpose programmable digital computers may be programmed to perform various arithmetic operations including floating point operations. That software approach is too slow, however, for modern applications such as those mentioned above. One way to hasten arithmetic operations is to use special purpose circuits. These circuits, commonly called coprocessors, are dedicated to performing mathematical operations in conjunction with a general purpose CPU such as that found in a modern microprocessor chip. Dedicated circuits of that type perform arithmetic operations significantly faster than doing so with software. The size and speed limitations of coprocessors, nonetheless, are inadequate for use in technical computing systems of the classes currently known as super-minicomputers or mini-supercomputers. Present day machines of that type operate at speeds (bandwidths) on the order of 20–50 MHz. Yet, available floating point hardware meeting size, cost and power constraints of such systems operate at half that rate, thereby wasting other system resources.

System designers face the restrictions of traditional hardware operations: floating point coprocessors are easy to design with, but offer limited performance. CMOS integrated chip sets can boost speed but demand substantial design efforts. Custom or semicustom components can provide excellent speed but also take considerable design resources and are very expensive to design and implement.

Many designers rely on a CMOS floating point chip set in a pipelined system to maximize performance. But latency can extend the computing time of a CMOS integrated circuit, for example, 100 nanoseconds, to three or four times that period for double-precision multiplication. In fact, for most technical applications it is latency, not the pipeline rate, that determines computation speed. Moreover, pipelining complicates both hardware and software design.

Bipolar technology was used to implement first-generation technical computing and digital signal processing systems because of its speed and availability. Since then, significant enhancements in CMOS technology have resulted in CMOS being favored over bipolar technology for many applications. Using VLSI technology, pipelined CMOS systems have achieved system-level throughput rates of 20 MFlops while maintaining power dissipation levels below 2 watts per package.

The most advanced integrated circuits known to be available for operations including floating point multiply are the Analog Devices ADSP3210 and the Texas Instruments 8847. The Analog Devices chip employs CMOS technology and requires four passes through the multiplier hardware to perform a double precision floating point multiply in about 400 nanoseconds. The Texas Instruments chip employs a two-stage pipelined architecture having approximately a 50 nanosecond delay per stage in performing double precision multiply. A relatively fast bipolar integrated circuit presently available is the AMD 29325. That device performs a 32-bit single precision operation in about 100 nanoseconds. It is not capable of double precision operations.

Many designers perceive bipolar emitter-coupled logic (ECL) technology as having a less attractive price-performance combination compared to CMOS. To be suited for high-speed VLSI, the fabrication technology selected must be based on small, fast transistors. Traditional bipolar transistors were fast, but their relatively large size resulted in large device and interconnect capacitances. This, of course, limited their speed. Integrated circuits based on ECL technology also dissipated a great deal of power and were not densely packaged. Where speed was critical, designers would use CMOS technology to extract parallelism from algorithms and implement systems rather than designing with SSI and MSI components required by bipolar technology.

We have reassessed the architectural configuration of floating point processors, multipliers and ALUs commonly used in conventional practice, particularly in light of the development of more advanced integrated circuit processes. Several such processes have recently been described in the literature, including: Downing, P., et al., "Denser Process Gets the Most Out of Bipolar VLSI," Electronics, pp. 131–133, June 28, 1984; "A Bipolar Process That's Repelling CMOS," Electronics, p. 45–47, Dec. 23, 1985; "Surprise! ECL Runs on Only Microwatts," Electronics, pp. 35–38, Apr. 7, 1986; and Wilson, G., "Creating Low-Power Bipolar ECL at VLSI Densities," VLSI Systems Design, pp. 84–86, May 1986. Other VLSI bipolar processes include the National Semiconductor/Fairchild ASPECT process and the AMCC/Plessy HE1 process.

These more advanced processes provide increased speed and device density and lower power dissipation levels, which in turn offer several significant benefits to the system designer and user. First, smaller transistors enable higher density and thereby allow implementation of more complex functions on a chip. Second, with greater density, the system designer can use fewer parts, and power requirements are reduced. As a result, the speed and throughput of the overall system can be increased because the parts interconnection delay can be readily reduced.

SUMMARY OF THE INVENTION

New floating point circuitry according to the present invention represents substantial advances over the techniques and circuitry described above. In the preferred embodiment, a floating point chip set consists of a floating multiplier chip (FMPY) and a floating point arithmetic and logic unit (FALU) each incorporating flow-through architecture, implemented in VLSI bipolar emitter-coupled logic. The chips have latency times under 50 ns, faster than the pipeline speeds for CMOS chips doing comparable operations. The user can configure the FALU with either edge-triggered registers or transparent latches on the input and output ports, and can do so in the FMPY on the output ports. The latches help minimize problems caused by system-clock skew because an operation does not have to wait for a clock edge. An operation can start as soon as the latches are open and the chip receives a valid operation code and data.

Moreover, the architecture described below includes multiple clock inputs, adding flexibility and simplifying system timing. For example, connecting the input and output clocks (CK1 and CK2) together causes the input and output latches to act as a master-slave flip-flop pair.

Separate clock enables on each input and output port also decouple the cycle and operation times. This feature, which simplifies freezing operation of the chips for inserting wait states, is particularly useful since seven different operation times are possible. The separate input and output clocks can help the user minimize cycle time. The user can elect to bypass the input and output latches or both and operate the chips in a flow-through mode.

In a preferred embodiment, floating point instructions include multiply, divide, square root, add, subtract, absolute value, negate, min/max and compare. Data formats include 32-bit and 64-bit, integer and floating point. The divide and square root functions are primitives that give full-precision results as defined by IEEE standard 754; no external lookup table or seed value is needed.

The floating point multiply chip FMPY includes a novel Functional Unit for carrying out floating point operations. Within the Functional Unit, the mantissa multiply circuitry includes a novel array of carry-save adder cells for reducing the partial product terms with minimum delay. According to one feature of the invention, the multiply circuitry includes a fast internal clock, nominally 500 MHz in an example of the invention, that is decoupled from the system clock. According to another feature of the invention, the carry-save adder arrays are organized in a regular, symmetric arrangement for ease of chip design, minimizing space requirements.

According to yet another feature of the invention, the partial products are iteratively reduced in the functional equivalent of a pair of registers. Thus, the function of a Wallace tree is implemented with only one-seventh the area or number of adders of a conventional Wallace tree configuration. Only two stages of registers are required to reduce 14 partial product terms.

In another aspect of the invention, the multiplier block includes means for segmenting the multiplicand into a plurality of slices, e.g., 8 bits wide in the preferred embodiment. Accordingly, the corresponding partial product terms, also 8 bits wide, can be reduced in 8-bit carry-save adder cells, thereby reducing gate delay times. A novel arrangement of the carry-save adder cells in the multiply block effectively accomplishes the shifting required by Booth's algorithm without special hardware dedicated to that task. This novel arrangement minimizes idle time of the hardware.

According to another feature of the invention, the two carry-save adder blocks are clocked on alternate phases of the fast internal clock, by incorporating flow-through architecture in lieu of conventional pipelining and register techniques.

An internal, high frequency clock drives the computational circuitry. To reduce the probability of errors in clocking in data at very high speed, the internal clock is stopped and restarted each time new operands are input.

A substantial advantage of the iterative multiplier of this invention is that it requires much less circuitry than prior combinatorial multipliers and can thus be integrated into a single chip. At the same time, throughput is not sacrificed, indeed can be enhanced, by running the iterative multiply circuitry from the internal clock much faster than the system clock and by use of flow-through architecture.

Other features of the invention include integer subtract logic adapted to operate in either carry mode or borrow mode, and novel absolute value subtract circuitry to accelerate floating point arithmetic with negligible added hardware.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 5 is a diagram of a 54-bit multiplier (i.e., first operand) showing the positions of the recoded groups of bits generated by the recoding logic of FIG. 4 with respect to the internal clock.

FIG. 7 is a diagram of a 54-bit multiplicand showing segmenting into slices which are identified with respect to the CSA cells shown in FIG. 6.

DETAILED DESCRIPTION OF A PREFERRED EMBODIMENT

General Arrangement and Data Path Operations

Figure 1:
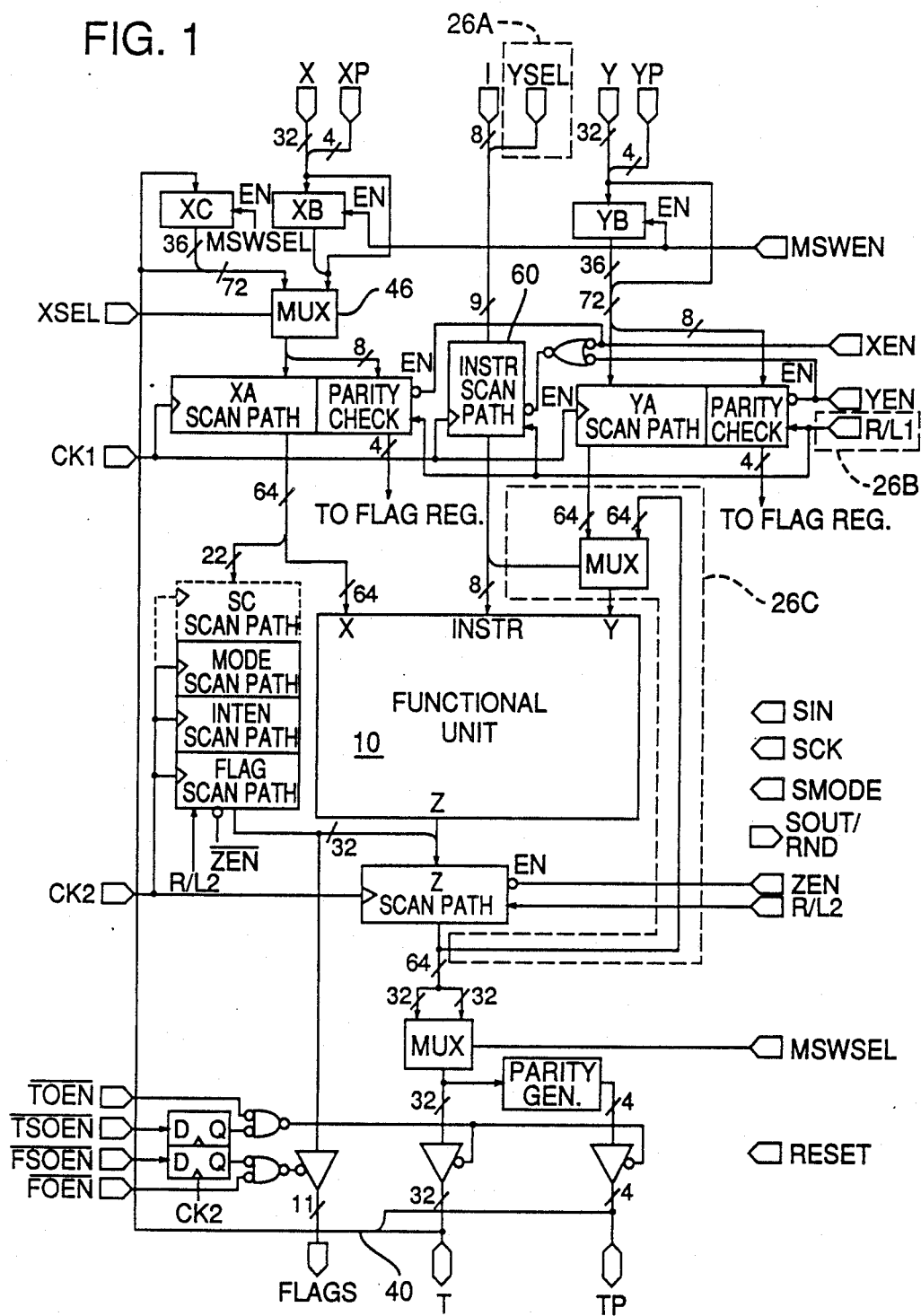
FIG. 1 is a block diagram showing the general architecture of an integrated floating point circuit in which the present invention is implemented in two embodiments; in the first embodiment the Functional Unit being a multiplier (FMPY) and in the second an arithmetic and logic unit (FALU), the elements shown in dashed lines indicating circuitry unique to the FALU embodiment.

Referring to FIG. 1, a block diagram is shown depicting the general architecture of an integrated floating point circuit in which the present invention is implemented in two embodiments. In the first embodiment, the Functional Unit 10 performs multiply, divide and square root, and the integrated circuit is referred to as a floating point multiplier, hereinafter designated "FMPY." In a second embodiment, the Functional Unit is an arithmetic and logic unit, and the integrated circuit is referred to as a floating point ALU, hereinafter "FALU." In the FALU architecture, the result Z may be provided back to the Y input of the FALU Functional Unit via multiplexer logic 26C, controlled by input YSEL 26A. This hardware is not included in the FMPY implementation. Also, the SC logic appears only in the FALU implementation.

The FMPY and FALU each provide two 32-bit (plus 4 parity bits) input data ports X and Y, and one 32 (+4) bit bidirectional data port (T). Data present at the T port is internally fed back via path 40 to the X input register, XA, via multiplexer 46 and may be selected by asserting XSEL. In addition, the 64 bit Z result can be fed back to the Y input multiplexer circuitry 26C (FALU only) and selected with YSEL.

Two modes are available for clocking the X and Y operands. When R/L1=1 (input 26B), XA and YA are configured as edge-triggered registers. Data is loaded on the rising edge of CK1. In the FALU, input R/L1=0 configures XA and YA as latches which are transparent when CK1=0. XEN enables XA to be loaded, and YEN enables YA to be loaded. The operation of the instruction register 60 is identical to that of XA and YA except that either XEN or YEN enable instructions to be loaded.

Output data may also pass through a register or a transparent latch. When R/L2=1, circuit Z is configured as an edge-triggered register. Data is loaded on the rising edge of CK2. Input R/L2=0 configures circuit Z as a latch which is transparent when CK2=1. ZEN enables circuit Z. The enables XEN, YEN and ZEN are latched internally.

Double Precision Operands

Referring again to FIG. 1, transparent input latches XB and YB are used to store the most significant word of a double precision operand from ports X and Y. The latches are transparent when the MSWEN clock is high.

Double precision operand transfers to the FMPY/FALU consist of two steps. First the most significant word is latched in XB/YB with MSWEN. The least significant word is then transferred through ports X and Y, concatenated with the contents of latches XB and YB respectively, and then clocked into circuits XA and YA with CK1.

Similarly, double precision operand transfers from the Z register/latch or T port will use latch XC to latch the most significant word. XC is transparent when MSWSEL is high. When MSWSEL is low, the least significant 32 bits of the result is output to the T port and fed back to the X input multiplexer. If XSEL is high, CK1 will clock the feedback operand into the XA register/latch.

The full 64-bit result is clocked into the Z register/latch with CK2. The output multiplexer then selects which half will appear at the T port. When MSWSEL is high, the most significant 32 bits of the result is output to the T port and is available at X input multiplexer 46.

Single Precision Operands

Single precision operands are clocked directly into registers/latches XA and YA; latches XB/XC and YB are bypassed. The single precision result is always output to port T, regardless of the state of MSWSEL. Definitions of input and output signals that are shown in FIG. 1 but not discussed here are published in "B3110/B3120; B2110/B2120 Floating Point Chip Set (Preliminary)" (Bipolar Integrated Technology, Inc., 1987).

Figure 2:
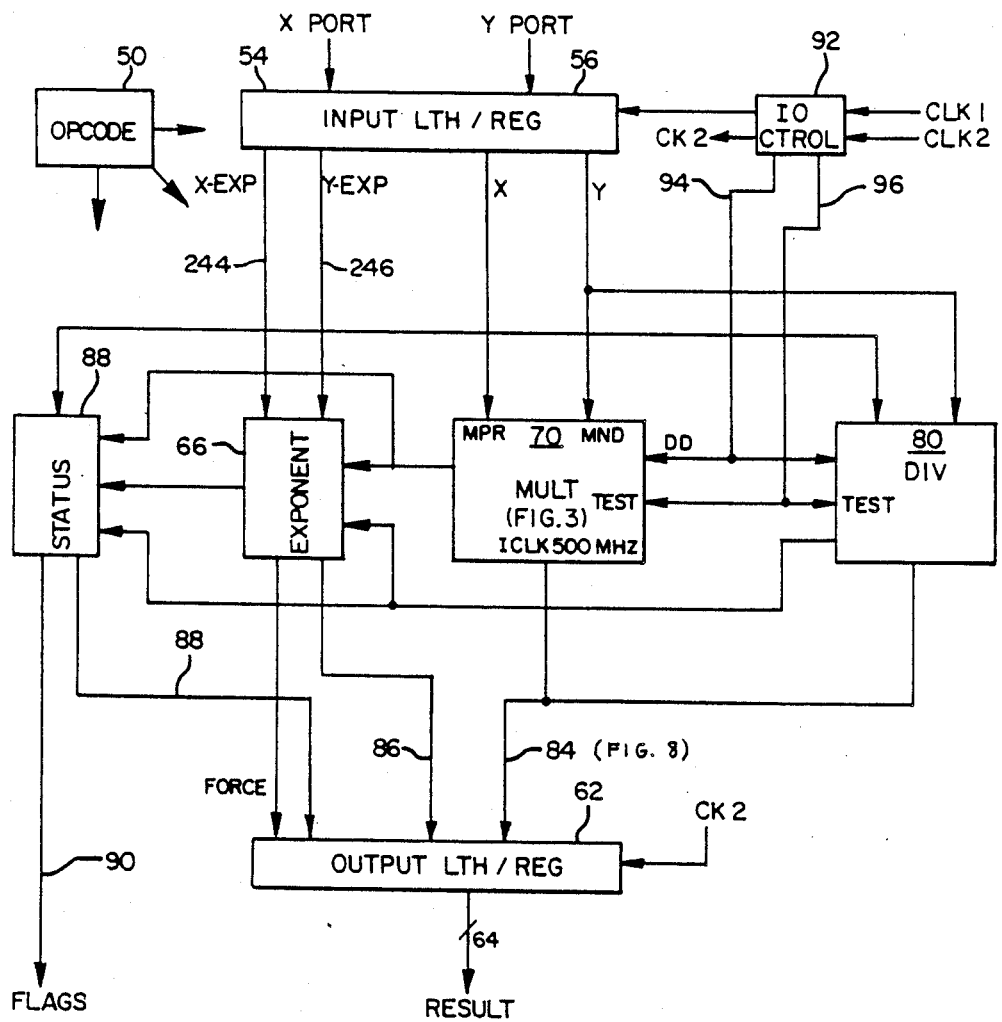
FIG. 2 is a block diagram showing the microarchitecture of the Functional Unit as a multiply block in the FMPY device of FIG. 1.

Referring now to FIG. 2, a block diagram depicting the microarchitecture of the Functional Unit in the FMPY implementation of the circuit of FIG. 1 is shown. The FMPY performs four types of operations: multiply, divide, square root and pass operand. Instructions are decoded in the opcode functional block 50. That block provides various control signals to other parts of the circuitry as appropriate. Data are input to the input latch/register 54 (X operand) and 56 (Y operand) as described above. Latch/register 54–56 consists of latches XA and YA shown in FIG. 1.

The Functional Unit hardware is divided into the following Functional Blocks. The exponent in a floating point operation is determined in the exponent block 66. Multiplication of the fractional part (mantissa) of floating point operands is carried out in multiply block 70. Division and square root are carried out in division block 80. Results of arithmetic operations from either the multiply block 70 or the division block 80 flow over data path 84 to the output latch/register 62. The exponent portion of a floating point operation is provided over data path 86 to the output latch/register. Additionally, status information may be provided to the output latch/register over path 88.

Referring now to the upper right portion of FIG. 2, the CLK1 and CLK2 signals are provided to IO control block 92. IO control block 92 provides a new data detect signal (DD) over path 94 to the multiply block 70 and the division block 80 when new data are received. The IO control logic also provides a test mode signal over path 96 to the multiply and divide blocks. In the test mode, the multiply and divide blocks operate internally at a faster than normal rate, as further described below.

Serial scan path capability is provided, as shown in FIG. 1, through all registers for purposes of testing and debugging. The inputs labeled SMODE, SCK and SIN are scan path inputs. The scan path circuitry provides a serial output at SOUT/RND.

Overview of The Multiply Block

Figure 3:
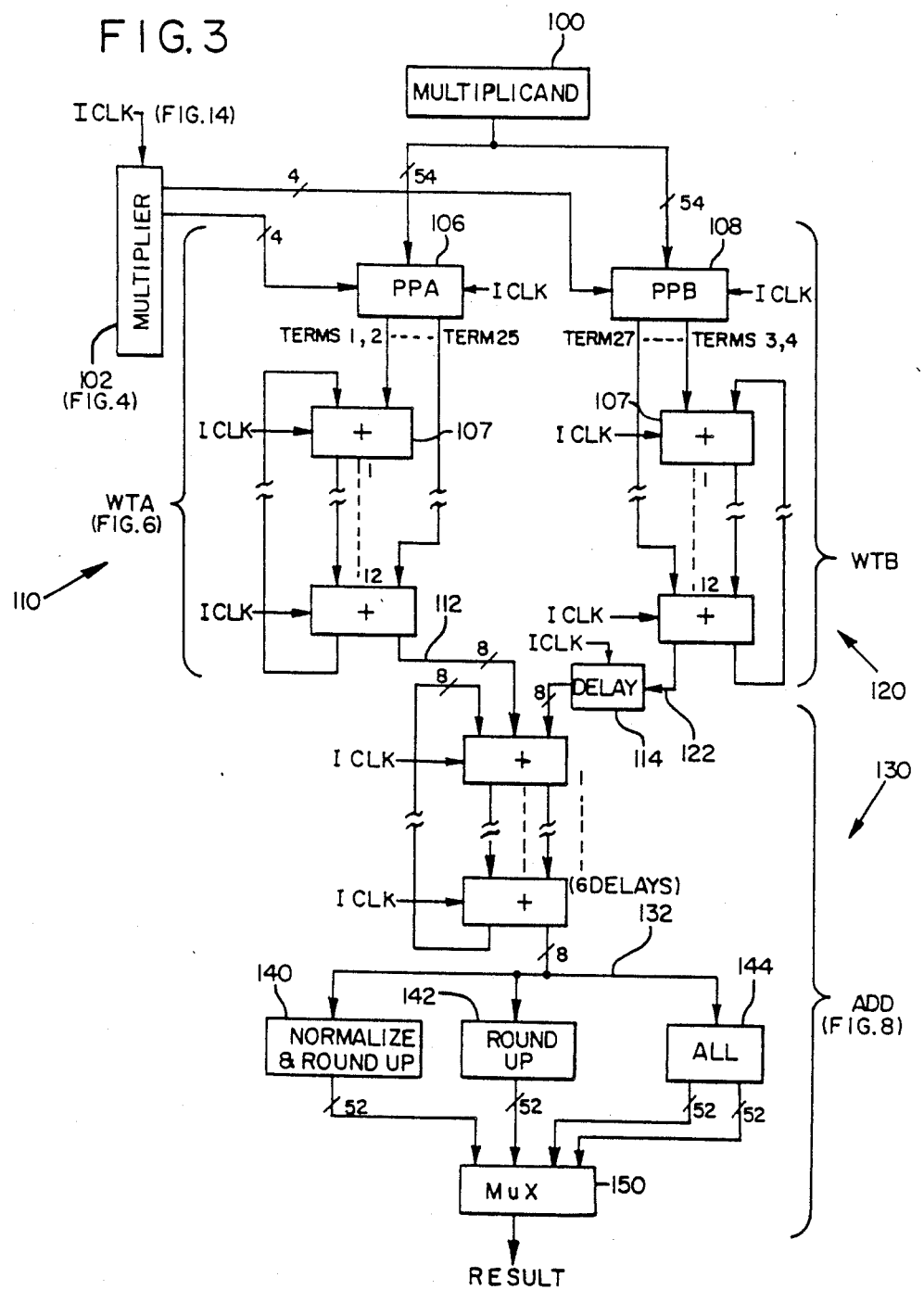
FIG. 3 is a register transfer level (RTL) diagram of selected portions of the multiply block of FIG. 2.

Referring now to FIG. 3, selected portions of the multiply block 70 of FIG. 2 are shown at the register transfer level. The multiplicand block 100 and multiplier block 102 receive operand information from the Y input register 54 and the X input register 56 (FIG. 2), respectively. The operand data is input to each of two substantially identical partial product (PP) blocks 106 (PPA) and 108 (PPB). The PP logic generates partial product terms.

The partial product terms are subsequently reduced in pseudo-Wallace tree WT logic, WTA 110 and WTB 120, so designated because it implements the function of a Wallace tree, though it is not so constructed. Instead of operating on a full-width multiplicand to produce and sum full-width partial products in a single, simultaneous parallel operation, the partial products are computed as partial product terms based on segments of the operands iteratively processed through a series of multiply and add stages 107. Then, to double the processing speed, two parallel series of stages 107 are provided that use alternative segments of the multiplier to produce partial results that are summed back together to give a final product. Partial product terms generated in PPA (the partial product logic block 106) are input to WTA 110. Partial product terms generated by PPB are reduced in WTB 120. Each of the WTs produces partial results.

Partial results generated in WTA 110 and WTB 120 are provided on data paths 112 and 122 to ADD circuitry 130. The ADD logic 130 accumulates the complete result. The result is provided on data path 132 to the inputs of each of three result registers: register 140 (normalize and round up), register 142 (round up) and register 144 (All). Finally, the contents of one of the result registers is selected in multiplexer 150 and the selected result is output to the output register/latch shown in FIG. 2. Additional detail of the multiplier logic block 102 is explained next, followed by a discussion of the timing of operation of the multiplier circuitry.

Multiplier Recoding

Figure 4:
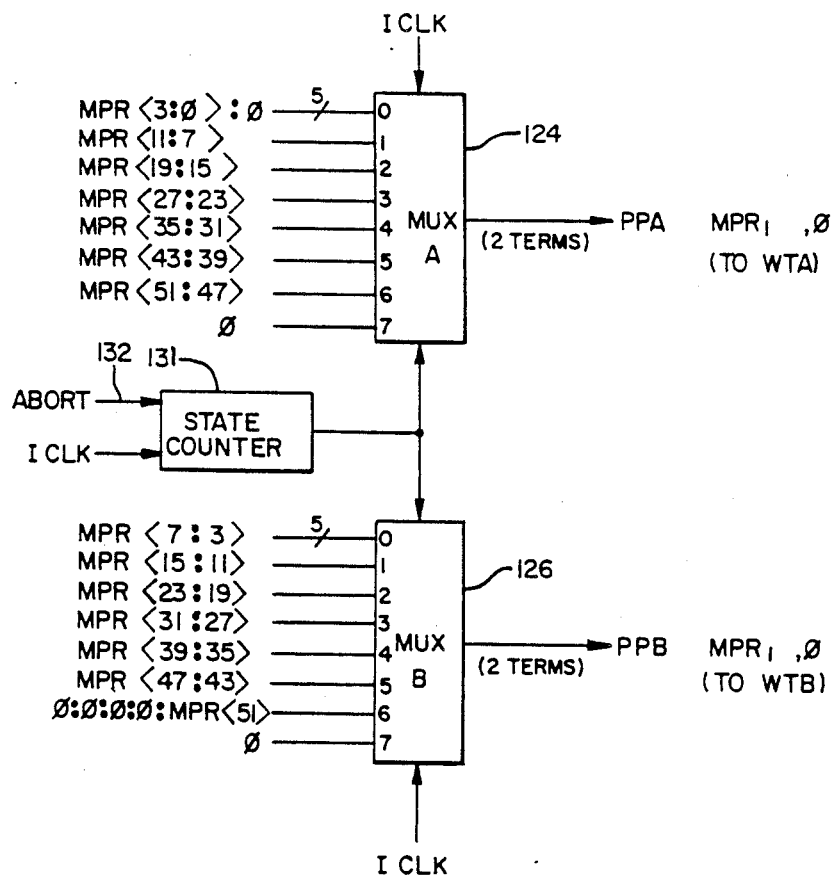
FIG. 4 shows additional detail of the multiplier recoding logic of the partial product blocks of FIG. 3.

Referring now to FIG. 4, additional detail of the multiplier recoding logic (block 102 in FIG. 3) is shown. The recoding logic includes first multiplexer/shift register logic 124 (MUX A) and second multiplexer/shift register logic 126 (MUX B). The select lines of the recode MUXs are driven by a state counter 131. Both the MUXs and the counter are clocked by an internal clock signal ICLK. The state counter is reset to start at 0 by ABORT signal on path 132. The state counter cycles through selections 0–7 and locks in state 7, until the abort signal is asserted to reset it.

Multiplier (MPR) bits are input to MUXs 124 and 126 in groups as shown in FIG. 4. The notation "MPR<a:b>" in FIG. 4 denotes multiplier bits a through b, inclusive, in parallel. Each input receives five multiplier bits. Input 0 to MUX A receives multiplier bits 3–0 plus a forced 0, for a total of 5 bits. Each 5-bit group is recoded to form a pair of 3-bit recode groups, PPA MPR0 and PPA MPR1, having 1-bit overlap. Recoding of the multiplier bits is illustrated in FIG. 5.

The recoding scheme carried out by the logic shown in FIG. 4 and illustrated in FIG. 5 is a second order extension of Booth's algorithm. This algorithm is explained in greater detail in U.S. Pat. No. 4,718,031. The recode bits indicate to the PPs the appropriate operation on the multiplicand required to create the partial product terms, as further explained in the next section.

On each cycle of the internal clock signal ICLK, the state counter 131 is incremented by one, and the multiplexers 124 and 126 output the next pair of recoded groups, in order of increasing significance. On the first clock cycle, the first pair of recode groups, corresponding to multiplier bits 3–0 (plus a hard 0), are output by the first multiplexer 124. At the same time, the pair of recode groups corresponding to multiplier bits 7–3 are output by multiplexer 126. Thus, two pairs or four recode groups of bits, corresponding to 8 bits of multiplier are generated by the logic shown in FIG. 4 during one clock period. This is indicated in FIG. 5 as ICLK cycle 0.

Generating and Reducing Partial Product Terms

The partial product logic 106 (PPA) and 108 (PPB) (FIG. 3) include circuitry for multiplying the multiplicand in accordance with the recode groups of bits. The recode bits are interpreted as indicated in the following Table:

TABLE 1

| Second order Booth's algorithm recoding | | | | |
|---|---|---|---|---|
| $a_{2i}$ | $a_{2i-1}$ | $a_{2i-2}$ | $b_i$ | operation |
| 0 | 0 | 0 | 0 | no operation |
| 0 | 0 | 1 | +1 | add the multiplicand |
| 0 | 1 | 0 | +1 | add the multiplicand |
| 0 | 1 | 1 | +2 | add twice the multiplicand |
| 1 | 0 | 0 | −2 | subtract twice the multiplicand |
| 1 | 0 | 1 | −1 | subtract the multiplicand |
| 1 | 1 | 0 | −1 | subtract the multiplicand |
| 1 | 1 | 1 | 0 | no operation |

In conventional multiplier architecture, the indicated operation on the multiplicand would be carried out in hardware having the same width as the multiplicand, here 54 bits. That arrangement would yield a full-width partial product, which is shifted, and then added together with other full-width partial product terms in a Wallace tree arrangement. Instead, the present invention includes a novel architecture better suited to dense integrated circuit implementation and very fast operation. Smaller, 2 by 8 bit multipliers generate the partial product terms. The terms are shifted and added in a regular array of carry/save adder (CSA) cells. Data is pipelined through the CSA array to maximize throughput of the circuitry as more fully explained below.

Figure 6A:
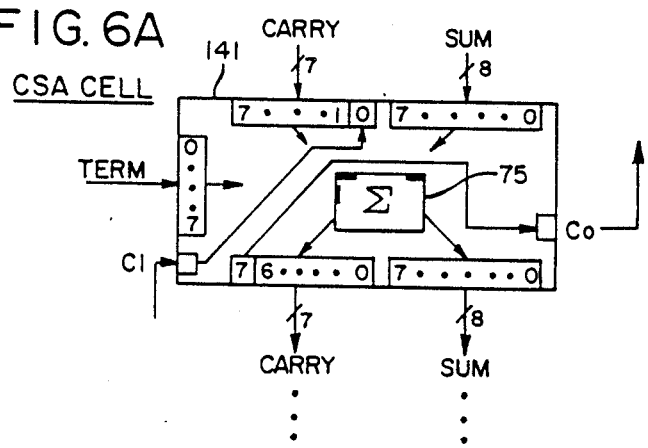
FIG. 6A shows a functional representation of a CSA cell.
Figure 6:
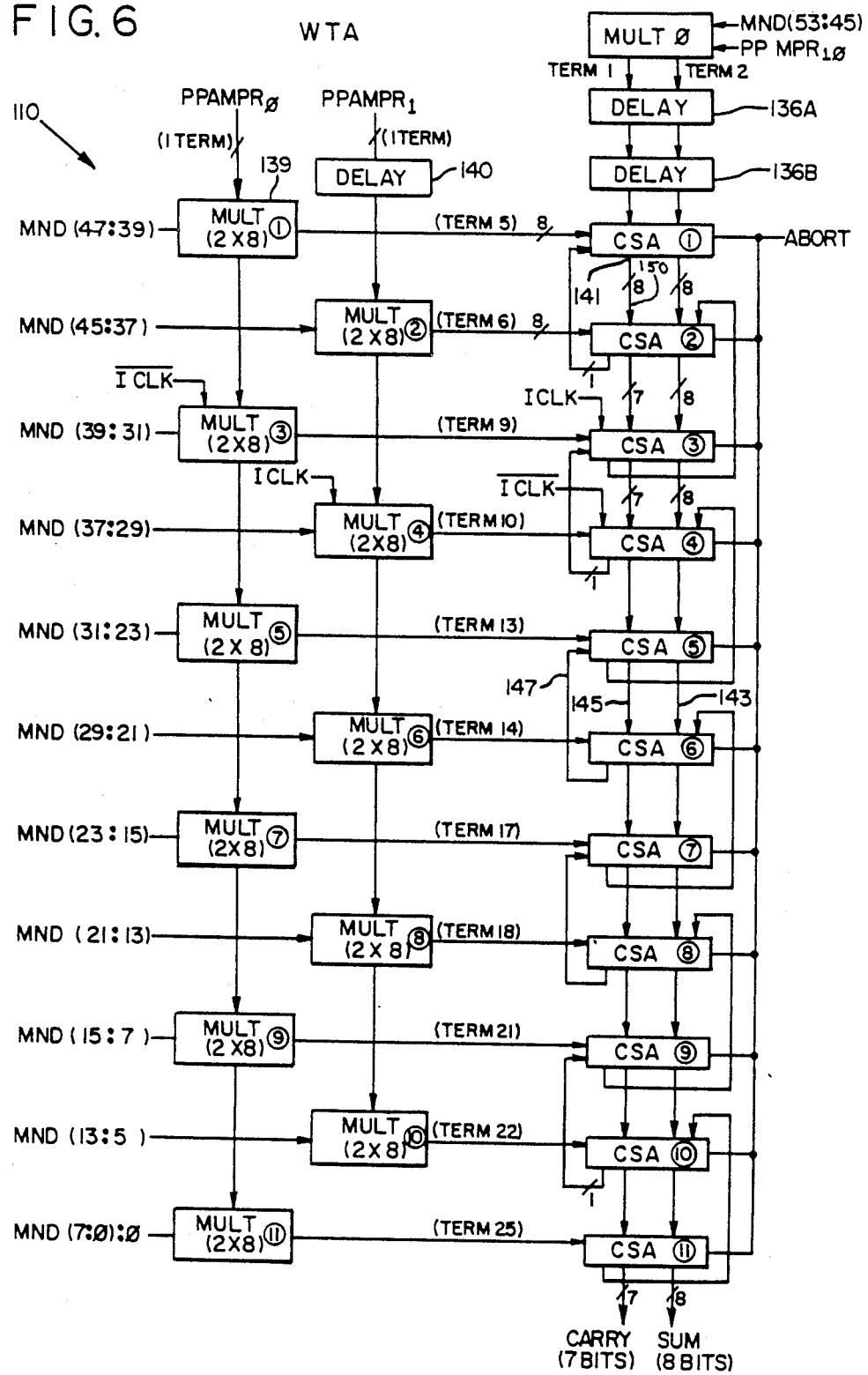
FIG. 6 shows additional detail of the WTA portion of the block diagram of FIG. 3, including partial product term multipliers and carry-save adder (CSA) cell array.

Referring now to FIG. 6, a functional block diagram of WTA 110 is shown. WTB 120 has the same structure and operation as WTA, although it operates on alternate recode groups. The WTA consists of a series of stages 107 (FIG. 3) including multiplier blocks 139 numbered 0–11 and an array of CSA cells numbered 1–11. The multiplier blocks (0–11) operate on the indicated multiplicand bits to generate 8-bit partial product terms. The partial product terms are added in the CSA array to form the product, which is shifted out the bottom of the array eight bits at a time. While partial product terms are being added in the CSA array, new recode terms PPA $MPR_0$ and PPA $MPR_1$ are input at the top to form new partial product terms. The new partial product terms are added in the array on subsequent internal clock cycles so that, in effect, the CSA array is pipelined. These internal operations, however, are transparent to the user because they are clocked by internal clock ICLK which runs much faster than the external clock (CLK1) and is resynchronized automatically (via signal ABORT) each time new data is input.

The specific multiplicand bits input to the multiplier blocks are identified at the left side of FIG. 6. Each multiplier block receives a 2-bit recode term as indicated at the top of the diagram. The recode terms PPA $MPR_0$ are input to multiplier blocks numbered 1, 3, 5, 7, 9 and 11. Recode terms PPA $MPR_1$ are input to multiplier blocks numbered 2, 4, 6, 8 and 10. The PPA $MPR_1$ term information passes through delay block 140 before it is input to the multiplier blocks for timing reasons discussed below.

Each of the multiplier blocks 139 operates on the multiplicand bits it receives in accordance with the recode terms input from the top of the diagram to produce an 8-bit result equal to one of −2, −1, 0, +1 and +2 times the multiplicand bits input to that particular multiplier, in accordance with second order Booth recoding. The 8-bit results from the 2×8 multiplier blocks are referred to as partial product terms, as distinguished from conventional partial products, which would have the same width as the multiplicand. The partial products terms referred to here are only 8 bits wide. The partial product terms are summed in the CSA Array next described.

The Carry-Save Adder (CSA) Array

Each of the partial product terms is input to a corresponding CSA cell 141 having the same number as the multiplier block 139 that generated that partial product term. An exception is the multiplier block numbered 0 which handles the most significant bits of the multiplicand, bits 45–53. As shown in the upper right of FIG. 6, multiplier block 0 receives both recode groups, $MPR_0$ and $MPR_1$, and the high order multiplicand bits as its inputs. This logic generates the first two partial product terms, term 1 and term 2. Term 1 and term 2 pass through two gate delays 136A and 136B, to arrive at the sum and carry inputs of CSA 1, as shown, one clock cycle later than term 5, for reasons which will become apparent.

The CSA cells 141 are interconnected such that the sum output, 8 bits wide, and the carry output, 7 bits wide, of each CSA are input to the corresponding inputs of the next CSA cell down the array. For example, referring to FIG. 6, note the interconnection between CSA 5 and CSA 6: The sum output of CSA 5 is provided to the sum input of CSA 6 along data path 143. The carry output bits of CSA 5 are provided to the carry input bits of CSA 6 along data path 145. The carry-out bit of each CSA cell is provided to the carry-in bit of the next preceding cell up the ladder. Thus, the carry out bit of CSA 6 is provided over data path 147 to the carry-in of CSA 5.

All of the CSA cells in the WTs are essentially identical. Functional detail of a representative CSA cell is shown in FIG. 6A. In FIG. 6A, the adder 75 (marked sigma) is logically equivalent to a conventional 8-bit wide carry-save adder array. The interconnection of the adder 75 with the input and output signals of the CSA cell are shown. In CSA 1, however, all of the carry-out information is input to CSA 2 along data path 150.

All of the CSA cells are connected to an abort input which clears the CSAs when the internal clock is restarted. This occurs at the beginning of each new multiply operation. Finally, the sum and carry outputs of CSA 11 are provided to the Add logic 130 (FIG. 3).

Operation of the wTs

Explanation of the operation of the WTA and WTB proceeds next as follows. First, the particulars of and reasons for segmenting the multiplicand bits as shown in FIGS. 6 and 7 are discussed. Then, the iterative process for reducing 27 partial product terms in the CSA array is explained.

Referring now to FIG. 7, a diagram is shown representing a 54-bit multiplicand, with the least significant bit, bit 0, at the right of the figure and the most significant bit, bit 53, at the left. Boxes around groups of bits are labeled to indicate which of the CSAs reduce the partial product terms that correspond to those groups of multiplicand bits. For example, referring to FIG. 6, the notation "MND (31:23)" is shown as an input to multiplier block 5. CSA 5 is the CSA cell that receives the partial product term (term 13) generated by multiplier block 5. Referring back to FIG. 7, a box 138 labeled "CSA 5" is shown encompassing bits 31–23.

The multiplicand is functionally partitioned or segmented into a series of seven 8-bit wide "slices." Seven 8-bit slices yields a total of 56 bits, rather than 54, so zeros are inserted in the high order 2 bits in the multiplier 0 block. Nine-bit wide groups of multiplicand bits are input to the 2×8 multiplier blocks, corresponding to each 8-bit segment plus the next less significant bit, so that, in cases where the recode bits indicate multiplication by two, this is easily effected in the 2×8 multiplier blocks by a left shift.

Conceptually, each multiplicand slice is reduced in accordance with the second order Booth recoding in its respective 2×8 multiplier block, and the resulting partial product terms are then reduced in the CSA adders. Booth's algorithm, however, requires shifting each of the partial product terms before it is added to the partial sum. Second order Booth recoding requires a shift by 2 bits before adding each partial product term. In the CSA array, the 2-bit shifting is effected without hardware dedicated to that task, and the width of the adders necessary for reducing partial product terms is substantially reduced, through iterative use of the array, as next described.

Figure 14:
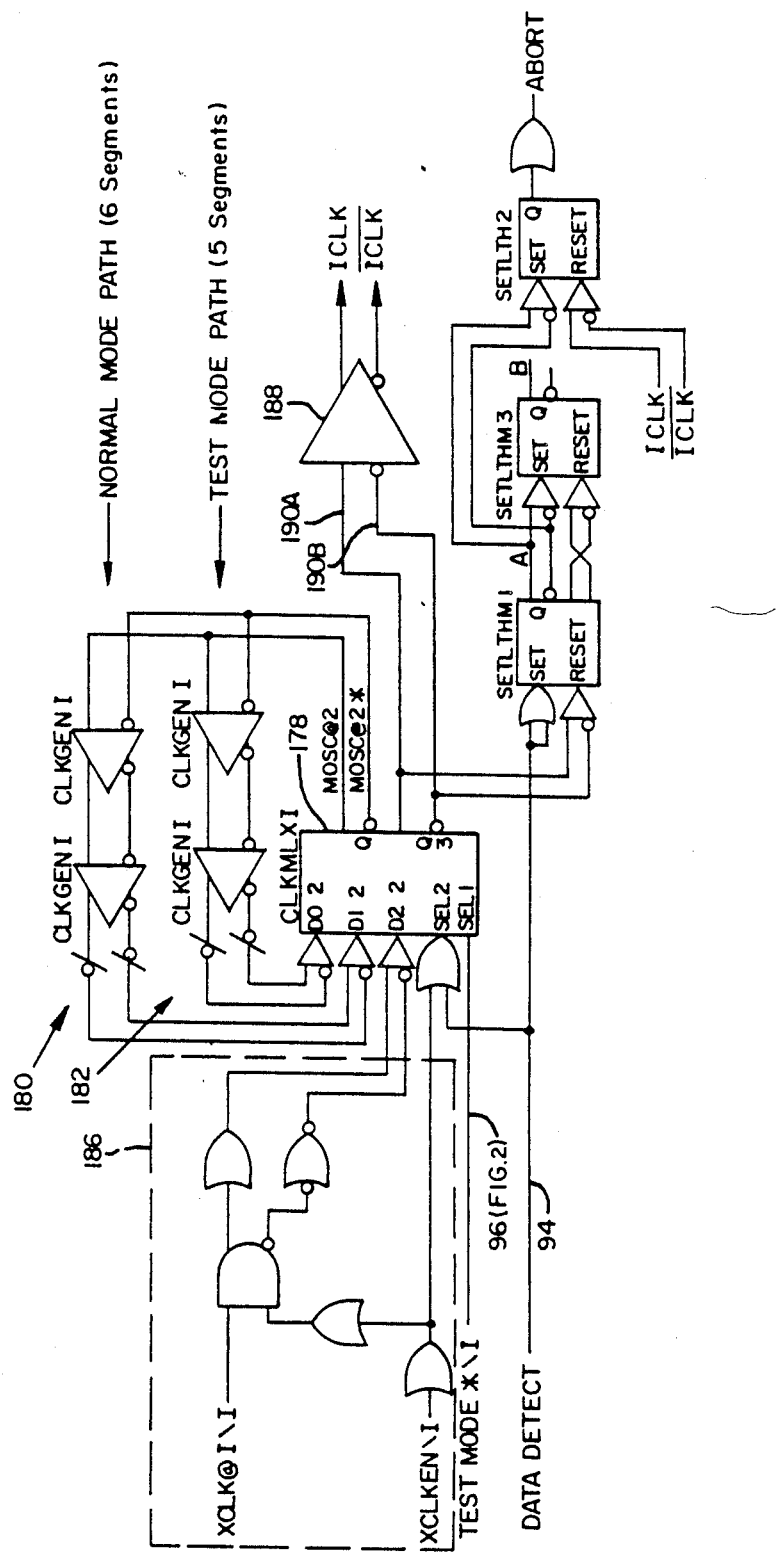
FIG. 14 is a logic diagram of the internal clock circuitry of the multiply block of FIG. 2, including data detect logic to stop and restart the internal clock when new data is received.

The WTA circuitry shown in FIG. 6 is clocked by a two-phase internal clock signal called ICLK and ICLK from the circuit of FIG. 14. For simplicity, these clock inputs are shown only at the multiply and CSA blocks numbered 3 and 4, but actually are input to all such blocks. During the first or even phase of the clock (ICLK), the left column of multiplier blocks, multipliers 1, 3, 5, 7, 9 and 11, carry out their respective operations on the multiplicand bits supplied to them in accordance with the PPA $MPR_0$ recode bits. These operations provide partial product terms to inputs of the like numbered (odd) CSA cells. Simultaneously, the same operation is carried out in WTB (not shown) on the same groups of multiplicand bits, in accordance with recode bits PPB $MPR_0$. Also during the even phase of the clock, the even numbered CSA cells sum the operands present at their inputs, thereby providing partial sums to the inputs of the odd-numbered CSA cells.

On the second or odd phase of the clock (ICLK), the even numbered multiplier blocks operate on multiplicand bits present at their inputs, in accordance with recode bits PPA $MPR_1$ (and PPB $MPR_1$ in WTB). The recode group PPA $MPR_1$ (and PPB $MPR_1$ in WTB) is delayed by one-half clock cycle in delay block 140. Also, during the odd phase of ICLK, the odd-numbered CSA cells add the terms present at their inputs. Thus, during one full clock cycle, an addition operation is carried out in each of the CSA cells as well as a multiplication in each of the 2×8 multiplier blocks.

It may be observed, most easily in FIG. 7, that a complete set of multiplicand bits are input to the odd numbered multiplier blocks, while a second set of multiplicand bits, also complete but shifted 2 bits less significant, are input to the even numbered multiplier blocks. For example, multiplicand bits 47–39 are input to multiplier block 1 while multiplicand bits 45–37 are input to multiplier block 2. Multiplier block 2 operates on MND (45:37) in accordance with $MPR_1$, whereas multiplier block 1 operates on MND (47:39) in accordance with $MPR_0$. Because $MPR_1$ is 2 bits more significant than $MPR_0$, as shown in FIG. 5, the partial product term resulting from multiplier block 2 (term 6) will have the same significance as the partial product term (term 5) generated in multiplier block 1. Thus, terms 5 and 6 may appropriately be added together (in CSA 2 as described below).

Similarly, all the groups of bits input to the even numbered multiplier blocks are shifted 2 bits from the right from those multiplicand bits input to the odd numbered multiplier blocks, so that pairs of partial product terms are properly aligned for adding in the CSA cells. The pairs in WTA are terms 1-2, 5-6, 9-10, 11-13, 17-18, 21-22. The other terms (3-4, 7-8, etc.) are processed in similar fashion in WTB. Effectively, the entire multiplicand is operated on by recode bits $MPR_0$ in the odd numbered multiplier blocks on the first clock phase to form a first partial product. Next, the multiplicand, shifted 2 bits to the right, is operated on by the recode bits $MPR_1$ in the even numbered multiplier blocks to form a second partial product. The first is added to the second partial product in the CSA cells. As noted above, similar operations occur in WTA and WTB simultaneously. Thus, two recode groups of bits, PPA $MPR_0$ and PPA $MPR_1$, are reduced in WTA during one clock cycle, while the PPB pair of recode groups of bits are reduced in the WTB. A total of four groups of recode bits are reduced in a single clock cycle, thereby retiring 8 bits of the multiplier and producing 8 bits of product. See FIG. 5.

The Next Byte

On the next clock cycle, the four recode groups of bits change to correspond to the next more significant 8 bits of the multiplier, bits 7–15. See ICLK cycle 1 in FIG. 5. The new $MPR_0$ and $MPR_1$ terms are input to the 2×8 multiplier blocks from the top of FIG. 6, and new partial product terms are added in the CSAs.

On each clock cycle, 8 bits of the product are shifted out the bottom of the CSA array, and each CSA effectively becomes 8 bits more significant. This relationship is illustrated in Table 2. In Table 2, time is indicated along the horizontal axis in units of clock cycles. Each clock cycle includes two columns of information, corresponding to the outputs of the CSA cells on the even phase or the odd phase of the clock. The Table shows which partial product terms are summed in each particular CSA during each particular clock cycle. Only the terms processed in WTA are shown. A total of 27 partial product terms are generated and reduced in the two WTAs during a full clock cycle. All the CSAs and delay 0 and delay 1 are cleared by the ABORT line, generated in the internal clock circuitry (FIG. 14) at the beginning of each multiply operation. The value of each partial product term then changes with each internal clock cycle. Accordingly, partial product terms in Table 2 are identified with an upper-case letter suffix indicating when that partial product term was produced, beginning with the letter A to indicate clock cycle 0.

TABLE 2

| | | Cycle 0 | | Cycle 1 | | Cycle 2 | | Cycle 3 | |
|---|---|---|---|---|---|---|---|---|---|
| | Abort | Even | Odd | Even | Odd | Even | Odd | Even | Odd |
| Delay | 0 | 1A,2A | | 1B,2B | 1B,2B | 1C,2C | 1C,2C | 1D,2D | 1D,2D |
| Delay | 1 | | 1A,2A | | | | | | |
| CSA | 1 | 5A | | 1A+2A+5B | 1A+2A+5B | 1B+2B+5C | 1B+2B+5C | 1C+2C+5D | 1C+2C+5D+6D |
| CSA | 2 | | 5A+6A | 232 | | | 1B+2B+5C+6C | 1B+2B+5C+6C+9D | |
| CSA | 3 | 9A | | 1A+2A+5B+6B+ 9C | 234 | 1A+2A+5B+6B+ 9C | 1A+2A+5B+6B+ 9C+10C | 1A+2A+5B+6B+ 9C+10C+13D | 1B+2B+5C+6C+ 9D+10D |
| CSA | 4 | | 9A+10A | 5A+6A+9B | 5A+6A+9B+10B | 5A+6A+9B+10B | | | 1A+2A+5B+6B+ 9C+10C+13D+ 14D |
| CSA | 5 | 13A | | 9A+10A+13B | 9A+10A+13B+14B | 5A+6A+9B+10B+ 13C | 5A+6A+9B+10B+ 13C+14C | 5A+6A+9B+10B+ 13C+14C+17D | 5A+6A+9B+10B+ 13C+14C+17D+18D |
| CSA | 6 | | 13A+14A | 13A+14A+17B | 9A+10A+13B+14B+ 17C | 9A+10A+13B+14B+ 17C | 9A+10A+13B+14B+ 17C+18C | 9A+10A+13B+14B+ 17C+18C+21D | 9A+10A+13B+14B+ 17C+18C+21D+22D |
| CSA | 7 | 17A | | 17A+18A+21B | 13A+14A+17B+18B | 13A+14A+17B+18B+ 21C | 13A+14A+17B+18B+ 21C+22C | 13A+14A+17B+18B+ 21C+22C+25D | |
| CSA | 8 | | 17A+18A | 13A+14A+17B+18B | 17A+18A+21B+22B | 17A+18A+21B+22B+ 25C | | | |
| CSA | 9 | 21A | | 21A+22A+25B | | | | | |
| CSA | 10 | | 21A+22A | | | | | | |
| CSA | 11 | 25A | | | | | | | |

To illustrate, column 195, representing cycle 0, even phase, shows terms 1A and 2A in Delay 0, term 5A in CSA 1, term 9A in CSA 3, term 13A in CSA 5, etc. Partial product terms just mentioned are added in the respective CSAs to the existing partial sums, in this case 0 because it is the beginning of a new clock cycle. During cycle 0-odd phase, while the odd numbered CSA cells are summing their input data, the even numbered multiply blocks are generating the corresponding partial product terms, 6, 10, 14, 18 and 22. Referring now to the column labeled cycle 0-odd, Table 2 shows the terms 1A and 2A present at delay 1, as shown above. In the same half cycle, terms 5A and 6A are summed in CSA 2. At the same time, partial product terms 9A and 10A are summed in CSA 4; partial product terms 13A and 14A are summed in CSA 5, and so on. Each of these pairs of terms are properly aligned with each other. Thus, as indicated in the Table, a series of slices making up a complete multiplicand (divided between WTA and WTB) are added into the even numbered CSA cells during clock cycle 0.

The next clock cycle, cycle 1, is shown in column 197 and column 198 in Table 2. New partial product terms 1B, 2B move through delay 0 on the first phase of the clock and delay 1 on the second phase of the clock. Also on the first phase of the clock, terms 1A and 2A from delay 1 are summed in CSA 1, along with partial product term 5B. 5B is the partial product term generated by multiplier block 1 in accordance with the recode bits presented in the present clock cycle 1.

On the second or odd phase of the clock, column 198, the output of CSA 1, i.e., terms 1A+2A+5B, are summed in CSA 2 with partial product term 6B. Corresponding operations on the other respective terms are carried out on other CSA as shown in the Table.

The progression of terms 1 and 2 through the CSA array is indicated by curved arrows, for example, arrows 232 and 234. Each term moves down the chain through two CSA cells (a cell pair) during one clock cycle. Additionally, during each clock cycle, additional partial product terms are added to the partial sums. For example, the new terms added to terms 1 and 2 are underscored in Table 2. As each partial sum moves down the CSA chain, it becomes 8 bits less significant with each clock cycle. Conversely, each CSA cell pair acquires 8 bits greater significance with each clock cycle.

To illustrate the foregoing principle, CSA cell 11, which receives partial product term 25 resulting from the least significant bits of the multiplicand, initially provides a partial sum which is the least significant portion of the product. Seven clock cycles later, bits in CSA 11 have significance equal to 7×8 or 56 bits greater than they had previously. These bits will become bits 54-61 of the product, which will correspond to the least significant 8 bits of the final result, after truncation and subject to rounding described below.

Seven clock cycles are required to generate and add all of the partial product terms in the WTAs to form a complete set of partial sums. The partial sums are shifted out into the Add logic 130 (FIG. 3) to form the result, as next described.

The Add Logic

Referring back to FIG. 3, the 8-bit result from WTA is provided along data path 112 to a carry-save adder. Also provided to the adder is the 8-bit result from WTB, via path 122 and through a delay block 114. This delay is provided because the partial product terms provided by WTB must be aligned with the partial product terms provided by WTA. It may be recalled from FIG. 5 that the recode groups input to WTA, designated PPA, are 4 bits less significant than the PPB terms input to WTB. The significance of each partial sum in the CSA increases by 8 bits each full clock cycle. The partial results provided by WTB are effectively shifted by 4 bits by delaying them ½ clock cycle.

Figure 8:
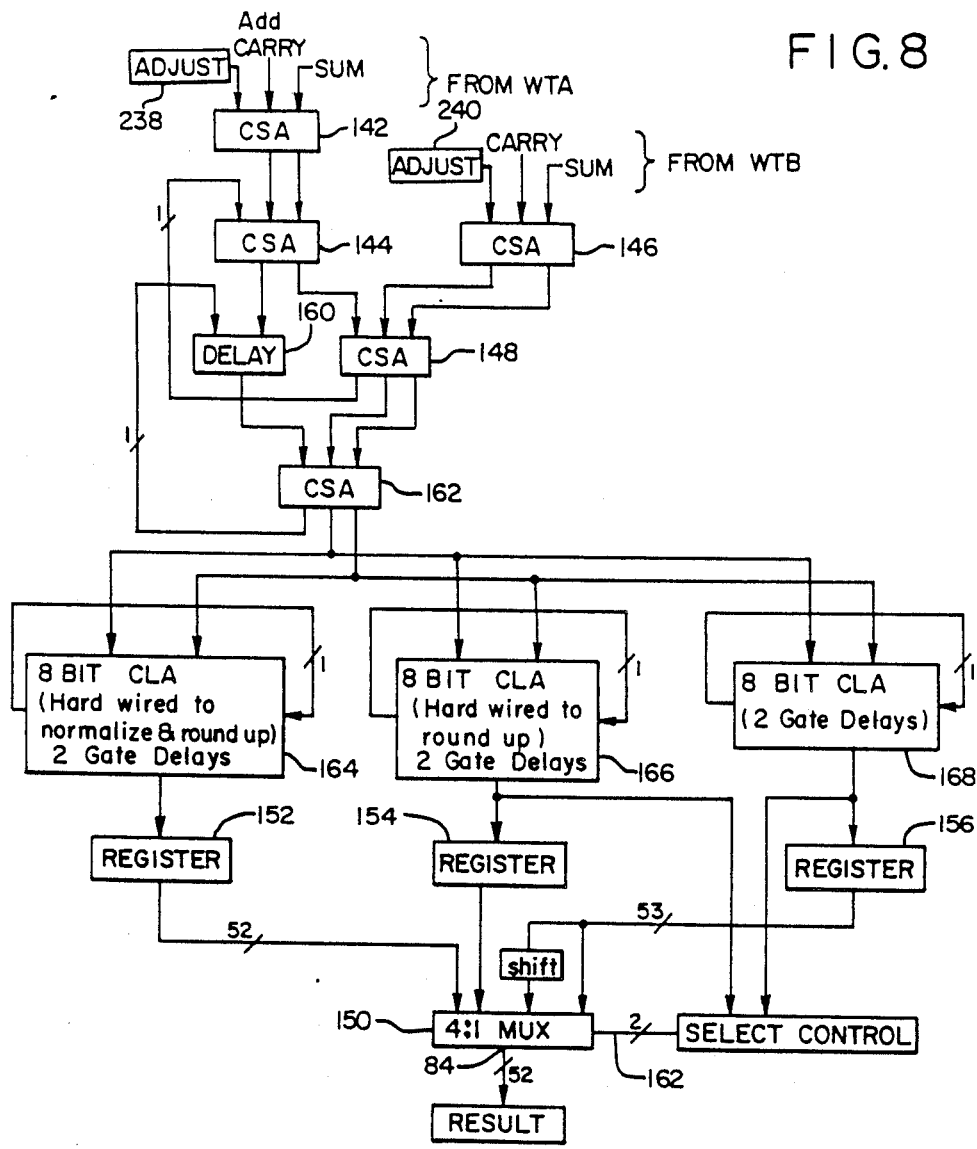
FIG. 8 shows additional detail of the Add logic of FIG. 3.

Referring now to FIG. 8, the sum and carry outputs from the WTA, i.e., from CSA 11, are input to a carry save adder, CSA 142. Similarly, the sum and carry outputs from WTB are input to CSA 146. Additionally, adjust bits 238 are input to CSA 142 and adjust bits 240 are input to CSA 146.

Figure 9:
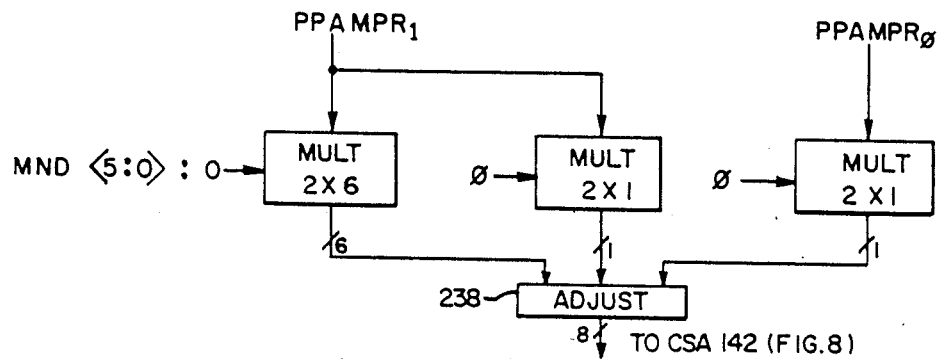
FIG. 9 is a functional block diagram of additional logic that provides the adjust bits input to the Add logic shown in FIG. 8.

The adjust bits are generated by the logic shown in FIG. 9. Only the logic for WTA is shown. The logic for WTB is substantially the same, except that in the WTB, the recode bits input at the top of FIG. 9 are PPB recode groups rather than PPA recode groups (See FIG. 5). In the WTB case, the adjust bits are identified by numeral 240 in FIG. 8. The adjust bits include the least significant bits of the product, resulting from multiplication of bits 5 through 0 of the multiplicand, as well as subtract bits, which provide a 1 where necessary to add to the result in a two's-complement subtract where needed.

The three inputs to CSA 142 are reduced to two terms which are input to CSA 144. Similarly, the three terms arising from WTB are reduced in CSA 146 to two terms which are input to CSA 148. CSA 148 reduces three terms, two of them from CSA 146 and one term from CSA 144, again to two terms, which are input to CSA 162. The other output from CSA 144 is delayed through Delay 160 in order to align it with the outputs of CSA 148. The resulting three terms are reduced in CSA 162 to form two final terms. The carry-out bit generated in CSA 162 is added in the delay logic 160 such that it increments the next byte, i.e., the data flowing down this chain on the next clock cycle. That byte will have 8 bits greater significance than the present byte.

The final two partial sums provided by CSA 162 are input to each of three 8-bit carry-lookahead (CLA) adders. These adders, only 8 bits wide, give rise to only two gate delays. CLA 164 is hardwired to normalize the result and round up. CLA 166 is hardwired to round up without normalization. Finally, CLA 168 merely passes the result without rounding. The outputs of each of the three CLAs are shifted into a respective register, 8 bits at a time, to form the mantissa portion of the product.

Accordingly, the 54-bit result is accumulated in each of three registers 152, 154 and 156. The outputs of the registers are provided to multiplexer 150. Additionally, the output of register 156 is shifted by 1 bit and provided to a fourth input to multiplexer 150. Finally, select control logic controls multiplexer 150 via control path 162 to provide any one of the four forms of result.

Referring back to FIG. 2, the selected result is provided over data path 84 to an output latch/register 62. It is combined there with exponent information provided over data path 86 to form the complete floating point product. The output latch/register is register Z on FIG. 1. The output register Z may be operated in a register mode, and clocked by clock signal CK2 so that the multiply result is effectively synchronized with the system clock.

Referring back to FIG. 2, the result formed in the output latch/register 62 includes the mantissa portion, provided over data path 84 in the exponent portion provided over data path 86. The exponent block 66 is disclosed in greater detail in FIG. 17.

The Exponent Logic

Figure 17:
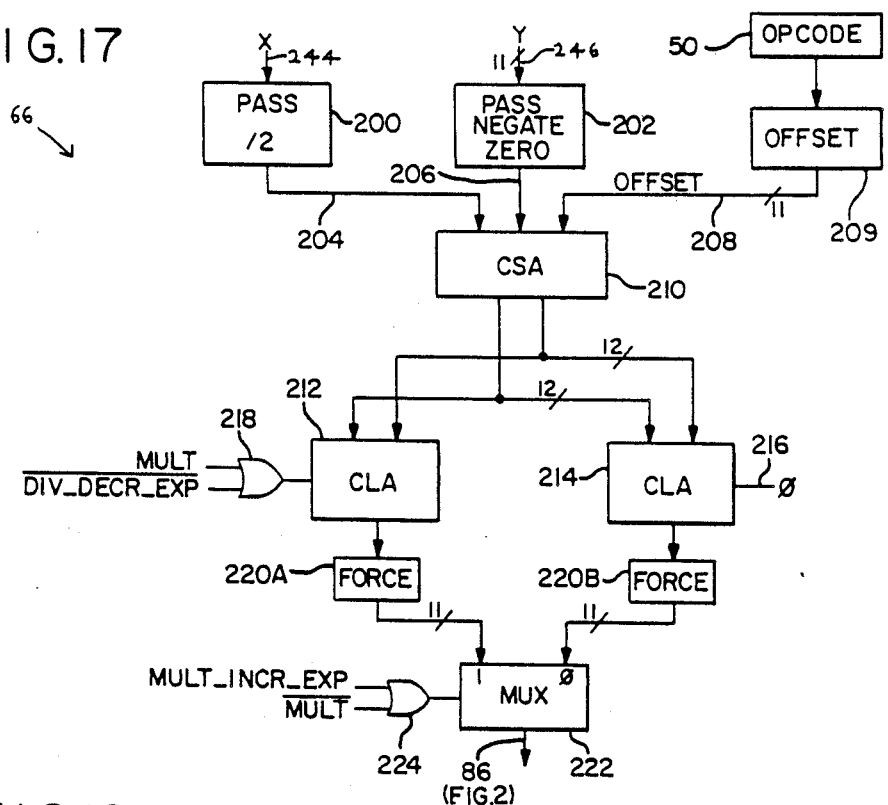
FIG. 17 is a register transfer level diagram of the exponent logic block of FIG. 2.

The exponents of the X and Y operands are input to the exponent logic block 66 as shown in FIG. 2. Referring now to FIG. 17, the exponent portion of the X operand, 11 bits wide, is input over data path 244 to logic block 200. The exponent portion of the Y operand, also 11 bits wide, is input over data path 246 to logic block 202. The opcode logic 50 decodes the current instruction and controls the exponent logic accordingly. Thus, logic block 200 can pass the X operand exponent, as it would in a multiply or divide operation, or divide that exponent by 2, as it would in a square root operation. Logic block 202 can pass the Y exponent, as it would in a multiply operation; negate the Y exponent, as it would in a divide operation, or zero the Y exponent as appropriate, for example, in a square root operation.

The opcode logic 5 also controls offset logic 209. The offset logic generates an offset term for adjusting the exponent to correct a bias.

The results from logic blocks 200, 202 and 209 are provided over data path 204, 206 and 208 respectively, to CSA 210 which sums these three terms to form two terms. The outputs of CSA 210 are provided simultaneously to the inputs of CLA 212 and CLA 214 where they are summed to determine a final exponent value.

The final exponent value depends upon whether or not the result need be normalized and, independently, depends upon whether or not the mantissa logic indicates a need to increment or decrement the exponent. The exponent is incremented in CLA 212 by virtue of the carry input from logic OR gate 218 when a multiply is performed (MULT=logic 1) or when the logic signal divide-decrement-exponent is false. The carry input to CLA 214, data path 216 is a hard zero, so the exponent is not incremented in CLA 214.

The logic OR gate 224 on the control input to MUX 222 selects the incremented exponent term (from CLA 212) in the event either MULT is high (the operation is not multiply) or multiply-increment-exponent is asserted. Thus, in a multiply operation, the incremented exponent will be selected in MUX 222 as needed.

The outputs of CLA 212 and CLA 214 are passed through force logic 220A and 220B, respectively. This logic forces the exponent to all 1's to indicate an overflow condition or all zeros to indicate an underflow condition, in accordance with industry standards. This architecture for determining the exponent in both incremented and non-incremented form at the same time, and then selecting the appropriate result, minimizes delay time.

Because the input to the floating point multiplier is effectively clocked in by CK1 and the output becomes available on the next subsequent rising edge of CK2, the multi-stage pipelining in WTA and WTB is transparent to the user. Instead, the floating point multiply appears to be single pipeline stage in which the latency is equal to the operation delay.

Figure 10A:
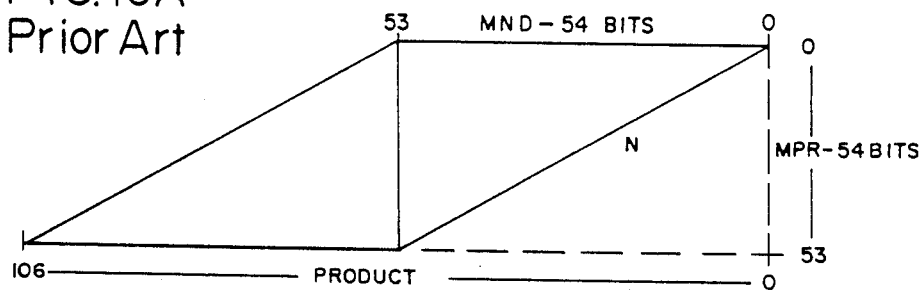
FIG. 10A is a conceptual diagram illustrating multiplication of a 54-bit multiplicand by a 54-bit multiplier using a conventional sequential technique.

The multiply operation described above is compared conceptually to previous methods in FIGS. 10 and 11. Referring to FIG. 10A, conventional sequential multiplication of a pair of 54-bit operands is illustrated. The multiplicand is successively multiplied by each of the 54 multiplier bits in ascending order of significance. Each of the 54 partial products is shifted one bit to the left and then added to the partial sum to form a new partial sum. Thus, after 54 multiply, shift and add operations, the 106 bit product is determined. Typically, the least significant 53 bits of the product are discarded. This approach requires 54 stages of adders. Accordingly, the hardware necessary to implement this approach is substantial and the number of gate delays incurred unacceptable for intensive computing.

Figure 10B:
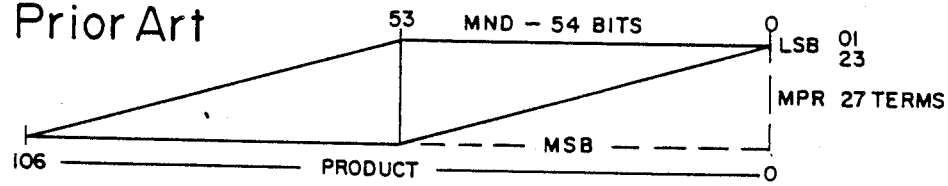
FIG. 10B is a conceptual diagram illustrating use of 2-bit modified Booth recoding to perform the same multiplication using one-half the number of full adder stages required to implement the technique of FIG. 10A.

Referring now to FIG. 10B, use of second order Booth recoding is illustrated as applied to the multiplication of a 54-bit multiplicand by a 54-bit multiplier. Two-bit recoding reduces the multiplier to 27 terms rather than 54 terms. The multiplicand is successively multiplied in accordance with each recode term, shifted two bits, and then added as above. This reduces the number of delays approximately in half though complexity increases somewhat. It remains necessary to have full width (54-bit) adders.

Figure 11A:
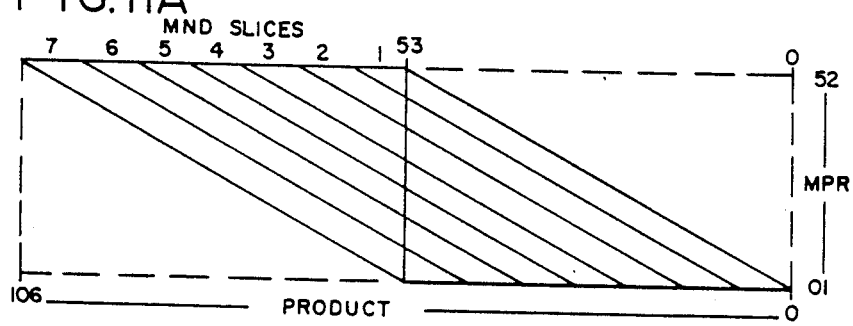
FIG. 11A is a conceptual diagram of a multiplication technique according to the present invention, including slicing the multiplicand into a series of 8-bit slices.

FIG. 11A illustrates segmenting the multiplicand, here into seven 8-bit "slices". Each slice is multiplied by a multiplier bit, shifted right one bit, and added to the partial sum. Segmenting allows the use of small CSA cells. This concept can be implemented in accordance with the present invention, in a chain of 16-bit wide CSA cells, 53 cells high.

Figure 11B:
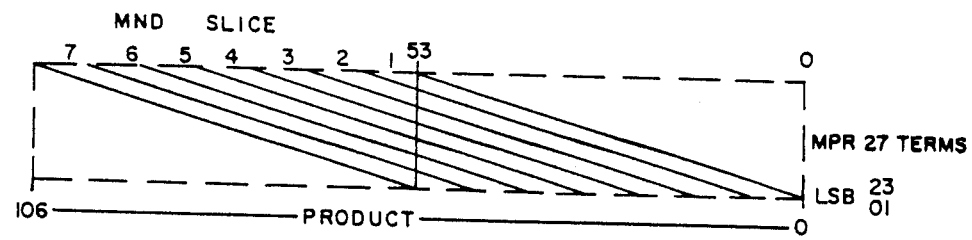
FIG. 11B is a conceptual diagram of a multiplication technique according to the present invention including slicing the multiplicand into a series of 8-bit slices and using 2-bit modified Booth recoding.

FIG. 11B is a conceptual diagram of a multiply operation as performed in the preferred embodiment. The multiplicand is segmented into seven 8-bit slices to allow use of a regular array of relatively small CSA adders. Second order Booth recoding reduces the multiplier terms to 27.

Figure 12:
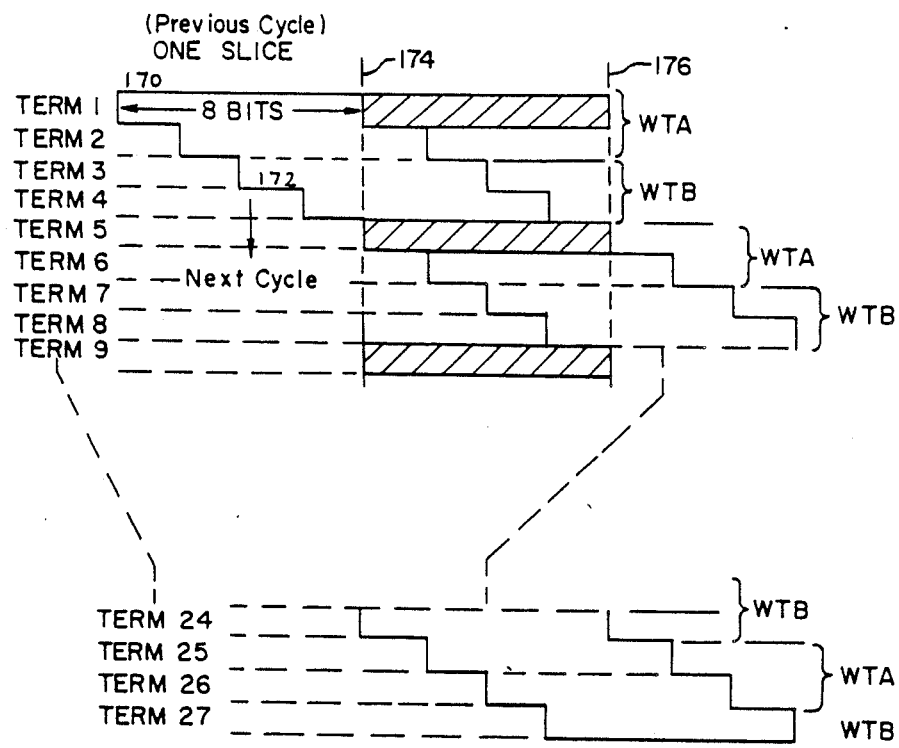
FIG. 12 is a fragmentary conceptual diagram of the technique of FIG. 11B showing the relative binary significance among the partial product terms associated with one slice of the multiplicand in the WT logic of FIG. 6, using the technique of FIG. 11A.
Figure 13:
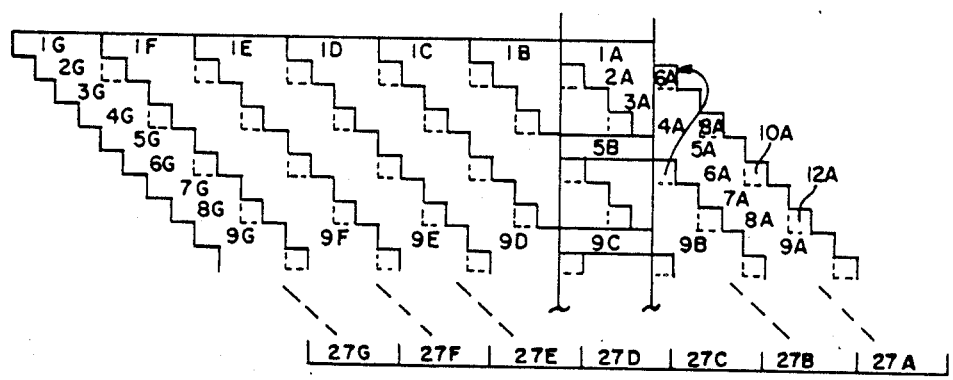
FIG. 13 is a fragmentary conceptual diagram showing the relative significance of the partial product terms, numbered 1-27, during successive cycles in carrying out a multiply operation in the WTA of FIG. 3 (and in the WTB, not illustrated), in which successive half-cycles of time are indicated by upper-case letters suffixed to the term numbers, A representing the first half-cycle, and in which the binary significance of the bits of each term are indicated by horizontal position, so that all of the bits in each individual vertical column have the same significance, and therefore are added together in WTA/WTB at the appropriate time.

FIG. 12 is a conceptual diagram showing additional detail of the multiplication technique illustrated in FIG. 11 as implemented in accordance with the present invention. FIG. 12 shows one of the 8-bit wide multiplicand slices of FIG. 11B. The partial product term numbers are set forth down the left side of FIG. 12. On the right side of FIG. 12, the allocation between WTA and WTB of the various terms is shown. The terms are interleaved in pairs so that, for example, terms 1 and 2 are reduced in the WTA while terms 3 and 4 are reduced in WTB, and so on.

In FIG. 12, the horizontal position of each bit indicates its relative significance, with the more significant bits toward the left. It may be observed here that each term is 2 bits less significant than the next preceding term. For example, the row labeled term 1 shows an 8-bit byte 170. In the row labeled term 2, a second byte 172 is shown 2 bits offset to the right from term 1. This is the two-bit shift required by the modified Booth's algorithm.

All of the bits in each column in FIG. 12 are summed in the CSAs to form the product. To illustrate, consider the 8 bits of information contained in the column bounded by dashed line 174 and dashed line 176. The shaded term shown on the row labeled term 5 lies within these bounds. In the row labeled term 9, it appears that the bits comprising term 9 on the next clock cycle fall within the same column, so they will be summed with term 5 of the present cycle. Similarly, it appears that the bits comprising term 1 during the preceding cycle also fall within this column so that they too are summed together with term 5 of the present cycle. This relationship is apparent in Table 2 above. Assuming that the clock cycle illustrated in FIG. 12 is cycle 1, the terms summed during that clock cycle are those having a suffix B in Table 2. Referring to Table 2, terms 1A and 2A are summed in CSA 1, together with term 5B. In other words, term 1 in the preceding clock cycle is summed with term 5 of the present clock cycle. This correlates with the illustration in FIG. 12 described above. During the next clock cycle, cycle 2, the present partial sum is added together with 9C, i.e., term 9 of the next clock cycle. That is a term that falls between the boundaries 174 and 176 in FIG. 12, so that term is aligned with term 5B and 1A. Table 2 shows all of the terms as they are added in the CSAs over four clock cycles from the beginning of a multiply operation. The 53×53 multiply generates 106 bits of result (53+53). To shift out this many bits requires 106/8 Cycles, or 14 clock cycles. It, therefore, takes 7 cycles to "fill" the WTA with a 54-bit terms, and it takes another 7 cycles to completely "drain" the 54-bit data from the array.

Internal Clock Circuitry

FIG. 14 is a logic diagram of the internal clock circuitry of the multiplier of FIG. 3. Multiplexer circuitry 178 is used to form an oscillator to generate the clock signal. A first feedback loop 180, including a pair of differential buffers, completes the oscillator circuit for normal operation. A second feedback path 182 is provided for test mode operation, in which the internal clock is run about 10% faster than its usual speed for purposes of testing an integrated circuit. The test mode is selected by asserting the test mode control line 96. The logic shown within dashed box 186 is used only for design debug in the integrated circuit manufacturing process. The clock signals are taken from the flip-flop outputs along paths 190A and 190B, the latter being the inverted clock signal. These are input to buffer circuitry 188 and then distributed to the circuit elements as needed.

Figure 15:
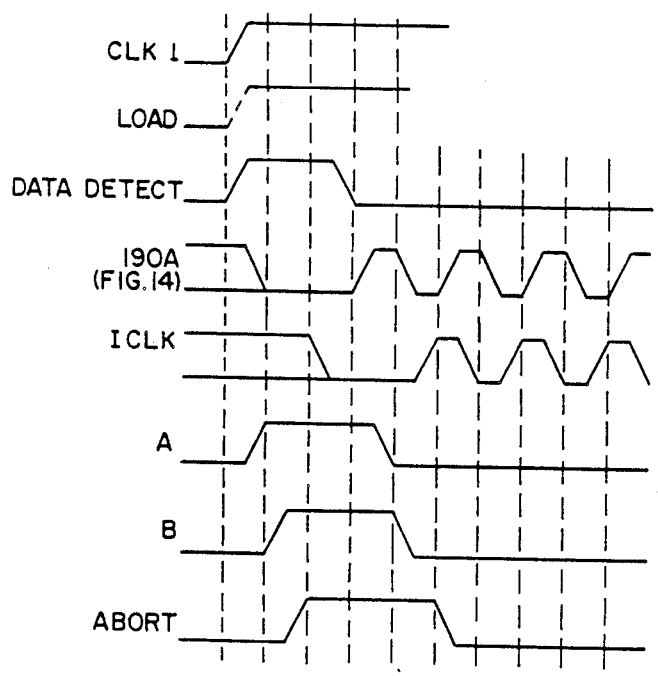
FIG. 15 is a timing diagram showing the operation of the internal clock of FIG. 14 including timing of the abort signal used to clear the multiply block of FIG. 2 when a new operation begins.

Referring back to FIG. 2, the IO control circuitry 92 provides a data detect signal on path 94 to signal the arrival of new data. That signal line 94 is input to the flip-flop circuit 178 to stop the internal clock and to assert the abort line to clear the multiplier circuitry. Thus, when new data is detected, the internal clock is stopped and the abort line os asserted to clear all of the multiplier circuitry. The internal clock then restarts to begin the multiply operation. In the preferred embodiment, the internal clock and the multiply circuitry runs at nominally 500 MHz. The timing relationships in the internal clock circuitry are illustrated in FIG. 15.

Figure 16:
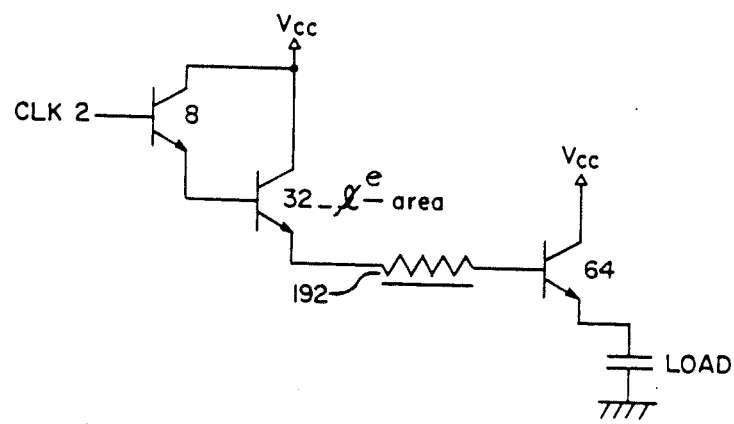
FIG. 16 is a schematic circuit diagram of the integrated clock driver circuitry for distributing and buffering the external clock signal CK2 in the FMPY of FIG. 1.

FIG. 16 shows a transistor level schematic diagram of the circuitry used to buffer and distribute the CLK 2 input signal. It is conventional to buffer an input signal of this type using, for example, a low output impedance amplifier stage such as a Darlington pair. However, distribution of the CLK2 over the area of the VLSI integrated circuit combined with the load placed upon the amplified CLK2 signal at remote locations to cause clock skew because of the capacitance of the loads. The circuitry shown in FIG. 16 is effective to minimize clock skew of that nature. As shown in the figure, a first stage is used including transistors having eight X and 32 X emitter areas, respectively, configured to form a Darlington pair. The capacitive/resistive nature of the distribution path across the integrated circuit is represented here by symbol 192. At a position on the integrated circuit remote from the first stage of the buffer, a second amplifier stage is provided having a 64 X relative emitter size. That final stage drives the load. This circuitry has been found effective to lower the RC time constant of the clock 2 distribution circuitry in order to sufficiently minimize skew.

Floating Point ALU Architecture

Figure 18:
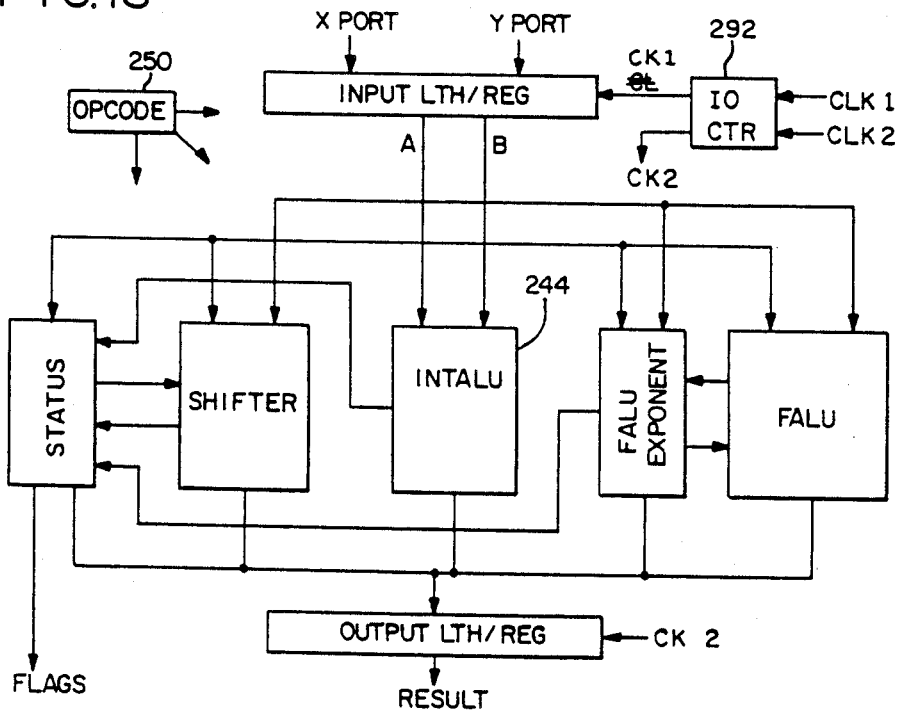
FIG. 18 is a block diagram showing the microarchitecture of the Functional Unit in the FALU implementation of the device of FIG. 1.

FIG. 18 is a block diagram showing the microarchitecture of the Functional Unit in the FALU implementation of the device of FIG. 1.

Borrow Mode Subtract

Figure 23:
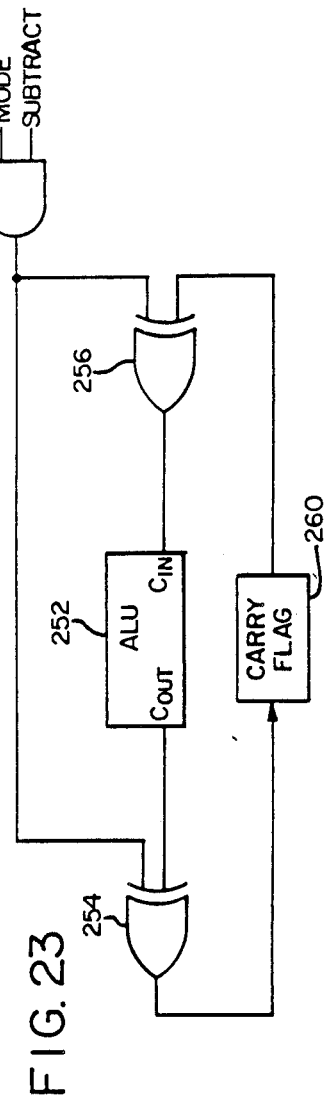
FIG. 23 is a logic diagram of the borrow mode logic implemented in the FALU.

The INTALU block 244 in FIG. 18 includes borrow mode subtract circuitry shown in FIG. 23. Referring to FIG. 23, the carry flag in the ALU is asserted whenever there is a carry out on the most significant result bit during arthimetic operations and set equal to the last bit shifted out during shift and rotate operations. However, the effect of the borrow mode bit in the mode register on the carry flag is implemented in a novel way. The following table illustrates the effect of borrow mode on the carry flag.

| $C_{OUT}$ | SUBTRACT | BORROW MODE | CARRY FLAG | $C_{IN}$ |
|---|---|---|---|---|
| 0 | 0 | 0 | 0 | 0 |
| 0 | 0 | 1 | 0 | 0 |
| 0 | 1 | 0 | 0 | 0 |
| 0 | 1 | 1 | 1 | 0 |
| 1 | 0 | 0 | 1 | 1 |
| 1 | 0 | 1 | 1 | 1 |
| 1 | 1 | 0 | 1 | 1 |
| 1 | 1 | 1 | 0 | 1 |

TABLE 3

Truth table for borrow mode logic.

| OPERATION | BORROW MODE = 0 | BORROW MODE = 1 |
|---|---|---|
| Some examples are: | | |
| (+2) + (−1) | CARRY = 1 | CARRY = 1 |
| (+2) − (+1) | CARRY = 1 | CARRY = 0 |
| (+1) + (−1) | CARRY = 1 | CARRY = 1 |
| (+1) − (+1) | CARRY = 1 | CARRY = 0 |
| (+1) + (−2) | CARRY = 0 | CARRY = 0 |
| (+1) − (+2) | CARRY = 0 | CARRY = 1 |

Borrow mode does not influence the function of the ALU, only the definition of the carry flag. The carry flag can be used in two ways. If the borrow mode bit is a 0, then the carry flag is set if there is a carry out of the ALU. This is the conventional definition of a carry out bit and is compatible with several available microprocessors. If the borrow mode bit is a 1, then the carry flag is set if there is a carry out of the ALU during additions, or if there is no carry out of the ALU during subtractions. The logic shown in FIG. 23, then, provides for the carry flag to be compatible with microprocessor systems which require a borrow flag or signal.

This concept is implemented in the logic shown in FIG. 23 as follows. The carry flag 260 is passed through an XOR 256 and provided to the carry input of the ALU unit 252. Similarly, the carry out signal from the ALU 252 is passed through an XOR 254 and then provided to the carry flag 260. The other inputs to the other two XOR gates are tied to the output of an AND gate 258. Thus, the carry flag input to the ALU and the carry output from the ALU will be inverted if, and only if, the output of AND gate 258 is high or true. The signal should be inverted only in forming a subtraction and in borrow mode, as distinguished from the conventional carry mode used by manufacturers of certain microprocessors. Thus, subtract and carry mode signals are input to AND gate 258 to control the XORs. This logic is contained in the INTALU block 244 in FIG. 18.

Floating Point Arithmetic

Figure 19:
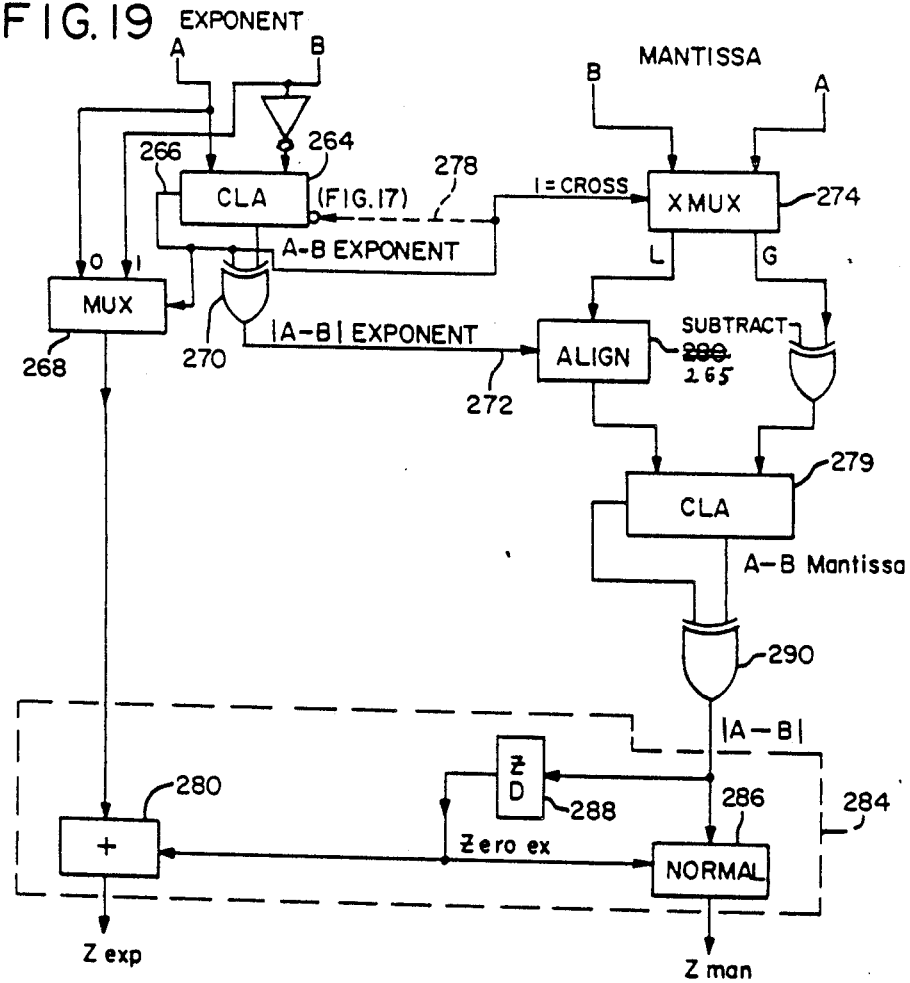
FIG. 19 is an RTL diagram of the absolute value subtract logic in the FALU block of FIG. 18.

Referring now to FIG. 19, a register transfer level diagram is shown of the absolute value subtract logic in the FALU block of FIG. 18. Addition and subtraction of floating point operands requires initially that the operands be adjusted to have the same exponent value so that their mantissas are aligned. The question is complicated because there is no way to detect at the outset which operand has the larger exponent nor which has the larger mantissa. The present invention includes a novel logic scheme to perform the necessary operations with minimum delay and a novel method of implementing that logic in a bipolar integrated circuit.

Referring now to FIG. 19, the exponents of two operands A and B are input at the top of the diagram to a carry-lookahead adder (CLA) 264. The same inputs are also provided to a multiplexer 268 for selecting one of the two. In order to align the mantissas, the difference between the two exponent values must be determined, that being the number of bits of shift required to align the mantissas, and it must be determined which exponent is the larger so that the smaller mantissa may be subtracted from the larger mantissa.

To determine which of the exponents is the larger, the G (generate) signal from the second or intermediate stage of CLA 264 is brought out on path 266 and input to control the multiplexer 268, N-bit wide XOR 270 and cross-multiplexer (XMUX) 274. Additionally, the G signal on path 266 is presented to the carry input to CLA 264, although it is done internally in the third stage of the CLA, as described below. This is the invert signal.

The invert signal is true when B has greater magnitude than A. In that event, the invert signal controls MUX 268 to select the B exponent for input to the adder 280. The invert signal on line 266 also controls the XMUX 274 to cross the mantissas so that the B mantissa is provided to the G (greater) path into the CLA 279. Finally, the invert signal is input to XOR 270 to cause it to invert the sum bits from the CLA 274 to form the absolute value of the difference between the exponents. The output of XOR 270 is provided over control path 272 to control the align register 265 to right shift the lesser mantissa bits by a number of bits equal to the difference between the exponents.

The absolute value of the difference between the two exponents is determined as follows. In the event that B is less than A, the absolute value of the difference is the same as the difference, and it passes through the XOR 270 without inversion because the invert signal on path 266 is low. If B is greater than A, the difference A minus B is a negative number which must itself be negated to form the absolute value of the difference. Two's complement negation requires inverting the bits and then adding 1 or, conversely, subtracting 1 and then inverting the bits. The latter approach is implemented here. One is subtracted because the invert signal is provided to the carry input of the third stage in CLA 264, as indicated by dashed line 278. Providing the carry-in bit to the third stage of the CLA 274 effectively subtracts 1 from the A minus B quantity. The XOR 270 then inverts that quantity, bit by bit, to complete the negation required to form the absolute value.

In the case where the exponents are equal, the invert signal on path 266 is not asserted and the A exponent is passed through MUX 268 to the adder 280 discussed below. Similarly, the A mantissa would pass along the greater path to a CLA 279. However, this may be incorrect in the sense that the B mantissa may actually be greater than the A mantissa. Accordingly, CLA 279 includes absolute value circuitry as does CLA 264. Accordingly, the correct result mantissa, A-B is used.

Finally, normalization logic, outlined by dashed box 284, is provided to normalize the results if necessary. The normalization logic includes logic 286 for shifting the result mantissa bits if necessary; 0 detect logic 288 and adder 280 for incrementing or decrementing the exponent. The floating point result is normalized such that the hidden bit is equal to 1.

Absolute Value CLA Architecture

Figure 20:
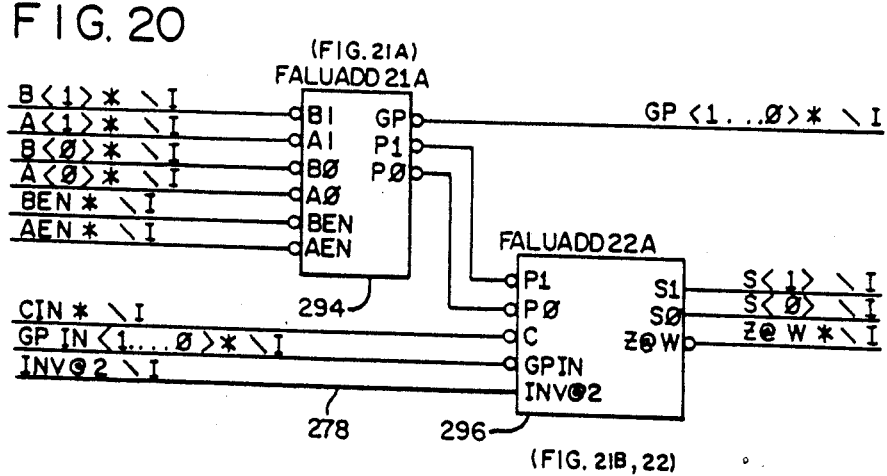
FIG. 20 shows a two-bit adder slice employed in each of the CLA adders of FIG. 19.

FIG. 20 illustrates in greater detail the architecture of the absolute value CLAs (264 and 279) of FIG. 19. Referring now to FIG. 20, a logic diagram is shown of a 2-bit slice of the first and third stages of the CLA adders of FIG. 19. The first stage adder 294 has inputs for the A and B operands, 2 bits wide each, and A and B enable signals, (not material here). The stage 1 logic 294 generates G and P bits at the GP output; and 2 propagate bits P0 and P1.

The third stage in the CLAs 264 and 279 is represented by the block 296. The inputs to block 296 are the propagate P0 and P1 output from block 294; CIN, the global carry in signal; GPIN, the generate and propagate less significant bits accumulated from all of the bits in the adder; and INV@2. INV@2 is the combined generate signal accumulated from all of the bits in the adder. The outputs provided by block 296 are 2 sum bits S0 and S1, and Z@W a 0 detect bit.

The XORs 270 and 290 are implemented inside the logic block 296 as further explained below.

Figure 21A:
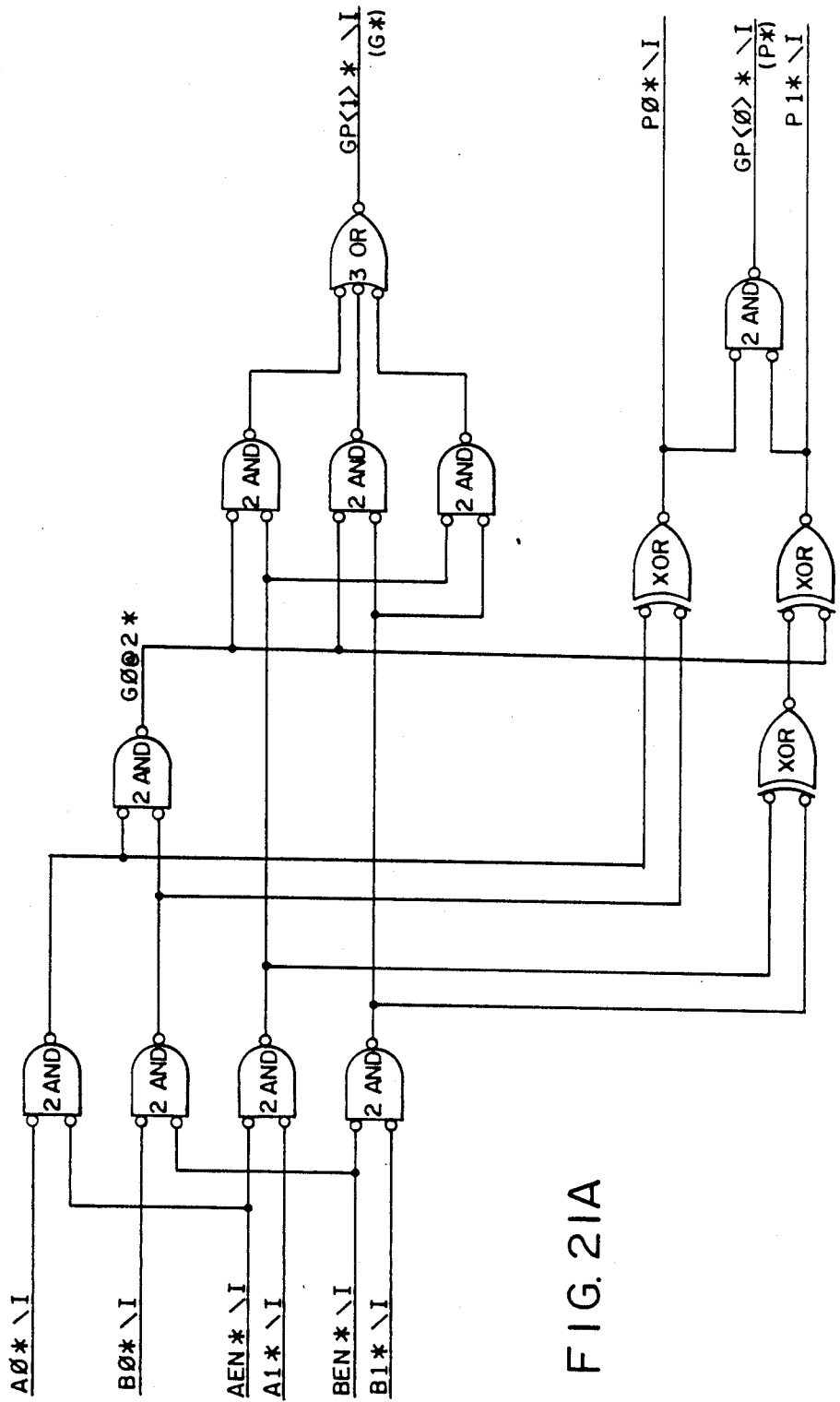
FIG. 21A is a logic simulation diagram showing the generate and propagate logic for the two-bit adder slice of FIG. 20.

FIG. 21A is a logic simulation diagram of the generate and propagate logic 294 of FIG. 20. Operation of this logic is known to persons skilled in carry-lookahead addition techniques.

Figure 21B:
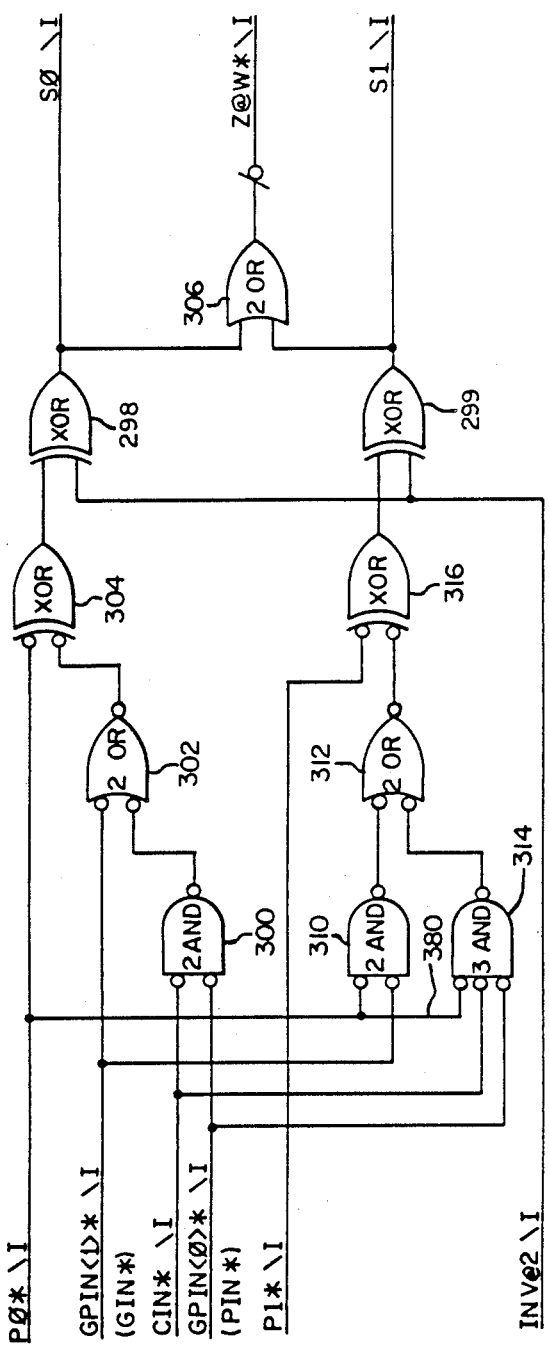
FIG. 21B is a logic simulation diagram of an additional portion of the two-bit adder slice showing the integrated implementation of the exclusive-OR circuitry of FIG. 19.

FIG. 21B is a logic simulation diagram of the logic block 296 of FIG. 20. This logic diagram shows how the XORs 270 and 290 are integrated into the third stage CLA logic. The function of those XORs is carried out by XORs 298 and 299 in the figure.

Figure 22A:
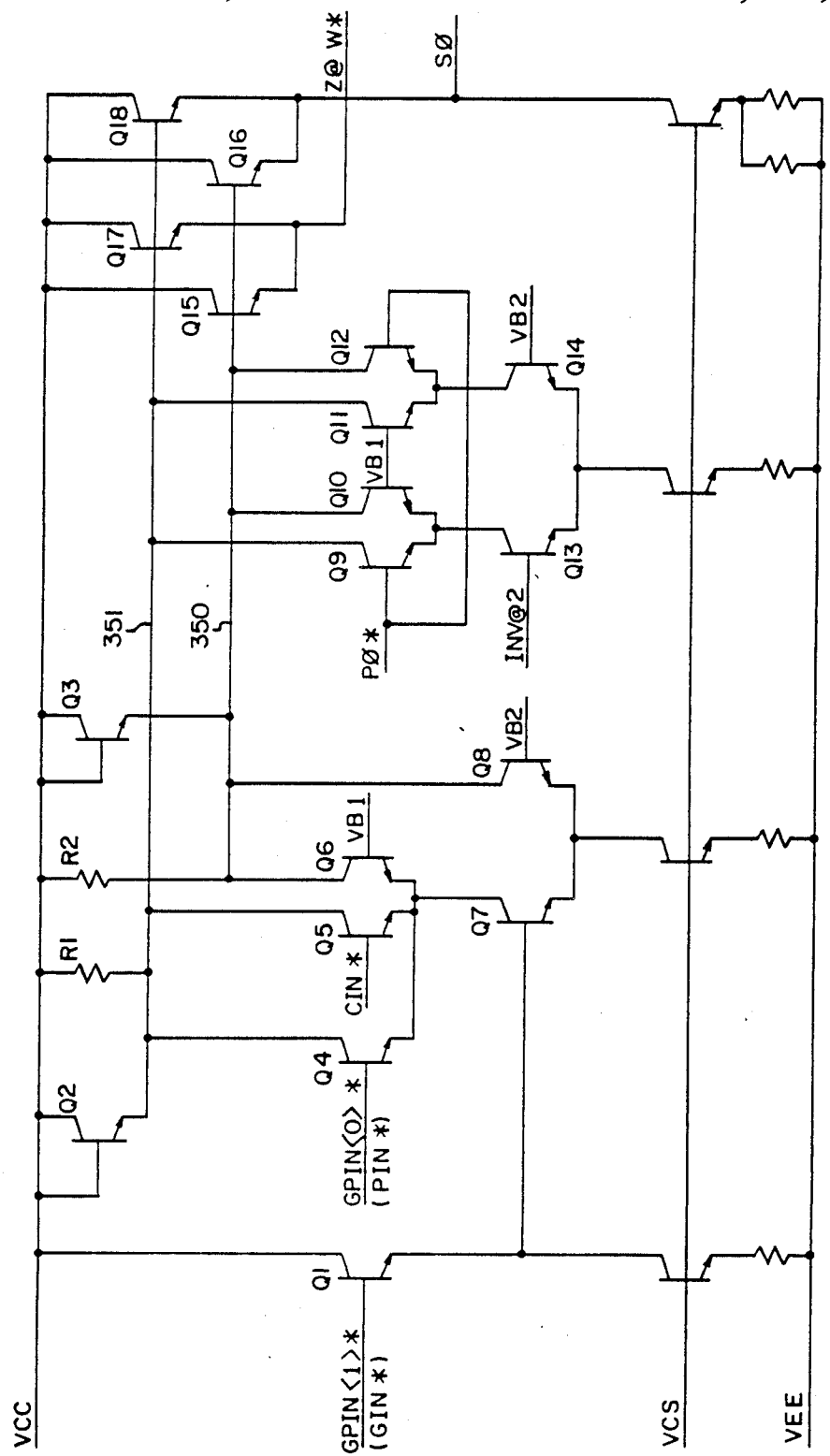
FIG. 22A is a transistor-level diagram of the LSB portion of the two-bit adder slice of FIG. 20.

FIG. 22A is a transistor level schematic diagram of the least significant bit portion of the logic block 296 of FIG. 20.

Figure 22B:
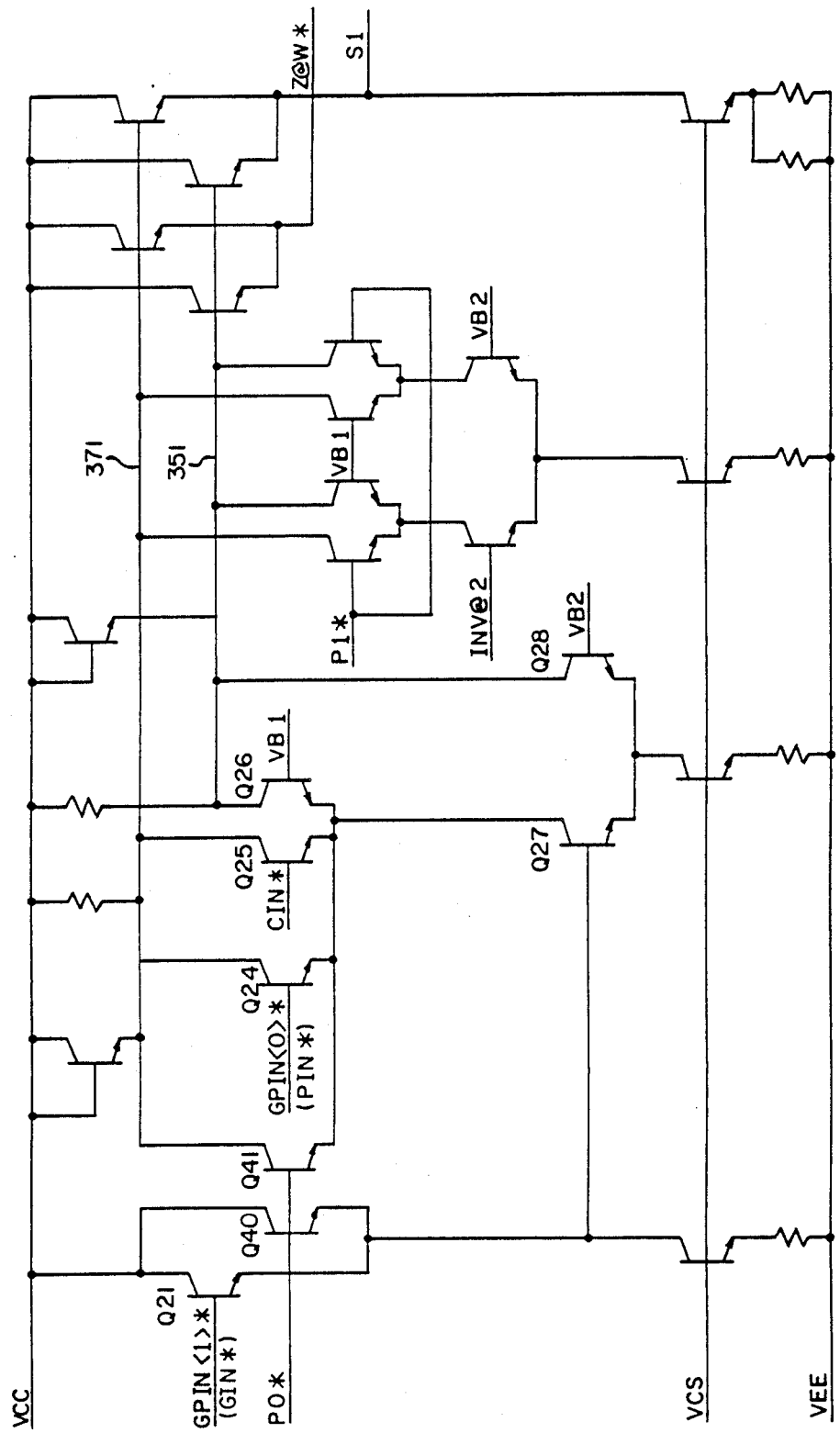
FIG. 22B is a transistor-level diagram of the MSB portion of the two-bit adder slice of FIG. 20.

FIG. 22B is a transistor level schematic diagram of the most significant bit portion of the logic block 296 of FIG. 20.

Referring now to FIGS. 22A and 22B, those skilled in the art may observe that the function of XORs 298 and 299 in FIG. 21B are implemented with virtually no additional transistors and, most important, no additional delay than would be incurred in their absence.

The LSB (Low-Order Bit) Adder Circuitry

FIG. 22A is a transistor level schematic diagram of the least significant bit portion, gates 300, 302, 304 and 298, of the third stage logic shown in FIG. 21B. The circuitry in FIG. 22A forms the least significant sum bit S0 of the two-bit slice.

Referring to FIG. 22A, VCC and VEE are the power supply signals. Signals VB1 and VB2 are reference voltages. VCS is a current source reference voltage. The unlabeled transistors and resistors in the bottom portion of the figure are conventional ECL current sources. Node 351 is pulled up to VCC through a resistor R1, and the current through R1 is clamped by a transistor Q2. Similarly, node 350 is pulled up to VCC through a resistor R2, and the current is clamped by a transistor Q3.

Referring to the output stage, transistors Q15–Q18, the sum output S0 is coupled to the emitters of transistors Q16 and Q18. This is a logical OR configuration, so that if either one or both of transistors Q16 and Q18 is ON, the output signal S0 is pulled high. The output signal Z@W* is coupled to the emitters of transistors Q15 and Q17 and duplicates the state of the S0 output signal to provide a wired-OR zero detect.

The right side of the circuitry, transistors Q9–Q14, are described next. Transistors Q13 and Q14 form a differential pair, controlled by the INV@2 signal. When the INV@2 signal is high, current flows in the collector of transistor Q13, thereby enabling a differential pair of transistors Q9 and Q10.

In operation, when INV@2 is high and P0* is high, transistor Q9 is ON, and it pulls down node 351. When INV@2 is high and P0* is low, current flows in the collector of transistor Q10, thereby pulling down node 350.

In the case where INV@2 is low, transistor Q14 is ON, thereby enabling the differential pair Q11 and Q12. When INV@2 is low and P0* is high, current flows in the collector of transistor Q12 pulling down node 350. If P0* is low, current flows in the collector of transistor Q11 pulling down node 351. Thus, when INV@2 and P0* have the same state, current flows from node 351, whereas if P0* and INV@2 have opposite states, current flows from node 350. Transistors Q9 through Q14 thus provide an XOR logical function of the P0* and INV@2 signals.

The left side of the schematic diagram in FIG. 22A, transistors Q1 and Q4–Q8, provide local carry-in logic as follows. The merged generate signal GIN* is coupled through transistor Q1 to a differential pair consisting of transistors Q7 and Q8. When GIN* is asserted, i.e., is low, current flows in the collector of transistor Q8, pulling down the voltage at node 350. When GIN* is high, transistors Q4 through Q6 are enabled. Then, if PIN* is high, indicating no propagate into this bit position, then current flows in the collector of transistor Q4 from node 351 and the carry input CIN* effectively is ignored. If there is a propagate signal from the less significant bits, then transistor Q4 is off and a carry-in signal, represented by CIN* being low, results in current flowing in the collector of transistor Q6 from node 350. Thus, a low voltage at node 350 indicates a carry into this bit. The CIN* and PIN* signals thus are combined in a logical AND function, represented by gate 300 in FIG. 21B.

In summary, if PIN* and CIN* are asserted (low), then the current flows from node 350. Alternatively, if GIN* is asserted (low), then current also flows from node 350 (through transistor Q8). This combination implements the OR function represented by gate 302 in FIG. 21B.

Another XOR function is accomplished with no additional circuitry and therefore, importantly, no added delay. It operates as follows: If both sides of this gate, the left side AND/OR circuitry and the right side XOR circuitry, steer current through the same leg, from node 350 for example, then node 351 would be high and the output S0 would go high because one of the emitter followers is high. In the same way, if both sides pull current through node 351, node 350 would be pulled high through resistor R2 and the output would be high. The only way the output is low is if both the left and right-hand sides of the circuit are steering the current to opposite nodes, one to node 301, one to node 300. In that case, both nodes 300 and 301 get pulled low, the output goes low. In this way, the function of a three-input XOR is provided, represented by gates 304 and 298 in FIG. 21B. Functionally, there is an XOR gate between nodes 350 and 351 which is preceded by an XOR gate between P0 and the INV@2 signal.

The MSB (High-Order Bit) Adder Circuitry

The MSB or high-order bit portion of the logic shown in FIG. 21B includes gates 310, 312, 314, 316 and 299. The logic is similar to the low order bit logic, except that the carry-in signal to bit position S1 is the logical AND of the carry-in to bit zero (CIN* AND PIN*) with the input bit zero (P0*). This function is represented by gate 314 in FIG. 21B. Implementation of the MSB logic at the transistor level is described next.

Briefly, in FIG. 22A, signals GIN*, PIN* and CIN* are all combined in transistors Q1 and Q4 through Q8, to generate the carry-in to bit position zero. Then, in FIG. 22B, transistors Q21 and Q24 through Q28 duplicate the carry-in logic on the left-hand side of FIG. 22A, along with the addition of transistors Q40 and Q41 to provide a logical AND of bit P0 with that carry-in function.

Referring to FIG. 22B, only the left-hand side of the gate, which generates the carry-in signal, is modified to include transistors Q40 and Q41. The remainder of the circuit is identical to that shown in FIG. 22A. Signal P0* is input to transistors Q40 and Q41. When P0*, the low order bit coming in is high (representing zero because the signal is active low), current flows through the collectors of transistors Q27 and Q41 into node 371, indicating no carry-in to this bit of the circuit. Conversely, if there is a carry-in to this bit, the circuit steers current through node 351. This carry information is exclusive-OR'd with INV@2 and P1* in the right side of the circuit, as described above, to generate the final sum output signal S1.

Using the MPY AND FALU Integrated Circuits

Figure 24:
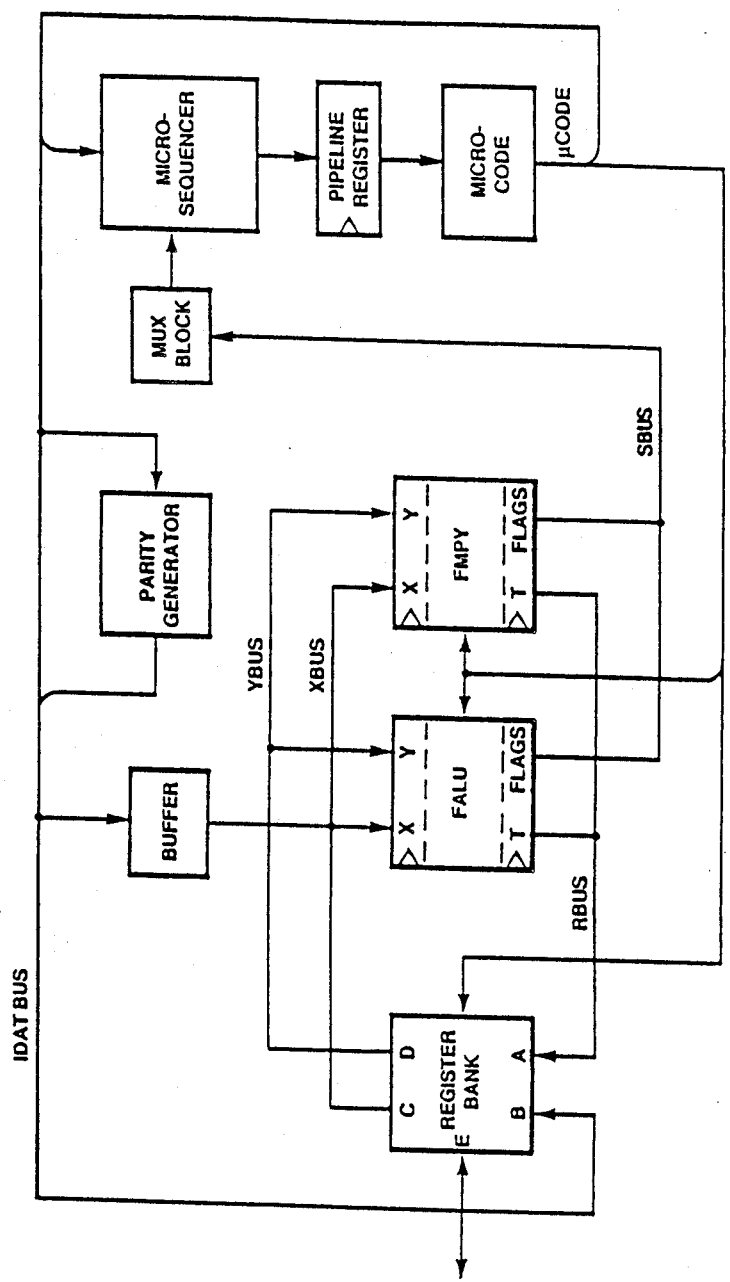
FIG. 24 is a functional block diagram of an example of a CPU including the FMPY and FALU integrated circuits of FIG. 1.

FIG. 24 is a register transfer level diagram of an example of a CPU using the FALU and FMPY integrated circuits. Details of one implementation of a CPU of this type are published in "Designing a Micro-Sequenced CPU with the B3110/B3120" Application Note AN-1 (Bipolar Integrated Technology, Inc., August, 1987).

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of determining the absolute value of the difference between binary operands A and B comprising:

providing a carry-lookahead adder;
inputting the A operand and the complement of B operand to the carry-lookahead adder;
extracting a merged generate signal for the entire adder to form an invert signal;
inputting the complement of the invert signal to the carry-in input to the adder to subtract 1 from the sum in the event the invert signal is true;
providing XOR means coupled to receive the sum output from the adder for inverting the sum output bit-by-bit; and
controlling the XOR means with the invert signal to invert the sum output if and only if the invert signal is true, whereby the difference A minus B is negated in the event B has a magnitude greater than A.

2. A method according to claim 1 in which the adder includes a plurality of bit slices and including the steps of:
in each bit slice, providing local carry-in logic for combining a merged propagate signal PIN* from less significant bit slices of the adder, a merged generate signal GIN* from less significant bit slices of the adder and a global carry-in signal CIN* from a carry input to the adder to define a local carry-in logic state;
in each bit slice, exclusive-OR-ing a partial sum signal with the invert signal to define a second logic state; and
in each bit slice, combining the carry-in logic state with the second logic state to form the sum output logic signal.

3. A carry-lookahead adder for generating the absolute value of the difference between the values of A and B binary operands, comprising:
means defining inputs to the adder for receiving binary operands A and the complement of B;
means coupled to the inputs for forming generate, propagate and partial sum logic signals for each bit position;
means for combining the generate and propagate logic signals from all less significant bit positions to form a merged carry generate logic signal and a merged carry propagate logic signal for each bit position;
first exclusive-OR logic means for combining the partial sum logic signals in each bit position with corresponding merged carry generate and merged carry propagate logic signals to form respective sum bits;
means for providing an invert signal indicating that B has a magnitude greater than A; and
second exclusive-OR logic means responsive to the invert signal for inverting the sum bits in the event B has a magnitude greater than A.

4. An adder according to claim 3 wherein the second exclusive-OR logic means is integrated within the carry-lookahead adder so as to controllably invert the sum bits without delay.

5. An adder according to claim 3 including local carry-in logic means in each bit position for generating a respective local carry-in logic signals and wherein the first and second exclusive-OR logic means include, in each bit position:
first and second nodes separately biased to a reference voltage source corresponding to a first logic state;
means responsive to the carry-in logic means for asserting the first node to a second logic state opposite the first logic state when the local carry-in logic state is true and for asserting the second node to a second logic state opposite the first logic state when the local carry-in logic state is false;
exclusive-OR logic means coupled to receive a partial sum signal and the invert signal for asserting the first node to the second logic state when the partial sum signal and the invert signal have the same logic state and for asserting the second node to the second logic state when the partial sum signal and the invert signal have opposite logic states; and
output means coupled to the first and second nodes for providing a sum output signal that is false only when both the first and second nodes have the second logic state;
the sum output signal being the exclusive-OR logical function of the partial sum signal and the invert signal and the local carry-in logic state.

6. A carry-lookahead adder having a plurality of bit slices, circuitry for each bit slice comprising:
first and second nodes separately biased to a reference voltage source corresponding to a first logic state;
carry-in logic means coupled to receive a merged propagate signal PIN* from less significant bit slices of the adder, a merged generate signal GIN* from less significant bit slices of the adder and a global carry-in signal CIN* from a carry input to the adder for determining a local carry-in logic state;
means responsive to the carry-in logic means for asserting the first node to a second logic state opposite the first logic state when the local carry-in logic state is true and for asserting the second node to a second logic state opposite the first logic state when the local carry-in logic state is false;
exclusive-OR logic means coupled to receive a partial sum signal PO* and an invert signal INV@2 for asserting the first node to the second logic state when PO* and INV@2 have the same logic state and for asserting the second node to the second logic state when PO* and INV@2 have opposite logic states; and
output means coupled to the first and second nodes for providing a sum output signal SO that is false only when both the first and second nodes have the second logic state, SO being the exclusive-OR logical function of PO* and INV@2 logic signals and the local carry-in logic state.

7. A carry-lookahead adder circuit for generating the absolute value of the difference between the values of A and B binary operands, the adder circuit comprising:
a plurality of N-bit adder slices, where N is a predetermined nonzero positive integer, circuitry for each N-bit adder slice comprising:
means defining inputs to the adder slice circuit for receiving a respective N-bit slice of binary operands A and the complement of B;
means coupled to the inputs for forming generate, propagate and partial sum logic signals;
means for combining the generate and propagate logic signals from all less significant adder slice circuits to form a merged generate logic signal and a merged propagate logic signal;
first XOR logic means for combining the partial sum logic signals with corresponding merged generate and merged propagate logic signals to form sum bits; and
second XOR logic means for inverting the sum bits;
the adder further comprising means for providing an invert signal; and
the second XOR logic means in each adder slice circuit being responsive to the invert signal.

* * * * *

UNITED STATES PATENT AND TRADEMARK OFFICE
CERTIFICATE OF CORRECTION

PATENT NO. : 4,982,352

DATED : January 1, 1991

INVENTOR(S) : Taylor et al.

It is certified that error appears in the above-identified patent and that said Letters Patent is hereby corrected as shown below:

Column 10    line 48, change the subtitle "Operation of the wTs" to --Operation of the WTs--;

Column 12    line 13, change "ar (R)terms" to --are terms--;

Column 17    line 23, change " logic 5 also" to --logic 50 also--.

Signed and Sealed this

Twentieth Day of April, 1993

*Attest:*

MICHAEL K. KIRK

*Attesting Officer*     *Acting Commissioner of Patents and Trademarks*